US012759014B2

(12) United States Patent
Huffman et al.

(10) Patent No.: US 12,759,014 B2
(45) Date of Patent: Oct. 13, 2026

(54) METHODS AND SYSTEMS FOR MAKING ENVIRONMENTAL SENSORS UTILIZING POWDER DISPENSING TECHNIQUES

(71) Applicant: Temptime Corporation, Morris Plains, NJ (US)

(72) Inventors: Brian S. Huffman, Belle Mead, NJ (US); Thi N. Do, West Orange, NJ (US); Deniz Boyu, Dover, NJ (US); Marielle K. Smith, Parlin, NJ (US)

(73) Assignee: Zebra Technologies Corporation, Lincolnshire, IL (US)

( * ) Notice: Subject to any disclaimer, the term of this patent is extended or adjusted under 35 U.S.C. 154(b) by 223 days.

(21) Appl. No.: 18/385,704

(22) Filed: Oct. 31, 2023

(65) Prior Publication Data

US 2025/0135490 A1 May 1, 2025

(51) Int. Cl.

| | |
|---|---|
| ***B05C 19/04*** | (2006.01) |
| ***B05C 5/02*** | (2006.01) |
| ***B29C 65/48*** | (2006.01) |
| ***G01D 1/18*** | (2006.01) |

(52) U.S. Cl.

CPC ............ *B05C 19/04* (2013.01); *B05C 5/0212* (2013.01); *B29C 65/48* (2013.01); *B32B 2305/54* (2013.01); *G01D 1/18* (2013.01)

(58) Field of Classification Search

CPC .......... B05C 19/00; B05C 19/04; G01D 1/18; B32B 2305/54

See application file for complete search history.

(56) References Cited

U.S. PATENT DOCUMENTS

| | | | | |
|---|---|---|---|---|
| 5,709,472 | A * | 1/1998 | Prusik | G01K 3/04 374/150 |
| 2003/0139234 | A1 | 7/2003 | Iggulden | |
| 2008/0056329 | A1* | 3/2008 | Smith | G01K 11/06 374/E11.006 |
| 2011/0180745 | A1 | 7/2011 | Margutti et al. | |
| 2021/0250025 | A1 | 8/2021 | Johnson | |
| 2022/0151266 | A1* | 5/2022 | Bushman | A23B 2/001 |

FOREIGN PATENT DOCUMENTS

| | | |
|---|---|---|
| KR | 20200020451 | 8/2018 |

OTHER PUBLICATIONS

Search Report and Written Opinion dated Feb. 6, 2025 issued for International PCT Patent Application No. PCT/US24/53318.

* cited by examiner

*Primary Examiner* — Carson Gross

(57) ABSTRACT

Disclosed is a process to manufacture an environmental sensor. The process includes dispensing a dry powder material to a first area on a media element, wherein the powder material includes a plurality of microcapsules, each microcapsule encapsulating an environmental indicator material. The process further includes dispensing an adhesive to the media element. After the powder material and the adhesive have been dispensed to the media element, the powder material is in contact with the dispensed adhesive, and the adhesive holds the powder material in position.

20 Claims, 23 Drawing Sheets

METHODS AND SYSTEMS FOR MAKING ENVIRONMENTAL SENSORS UTILIZING POWDER DISPENSING TECHNIQUES

BACKGROUND

The present disclosure generally relates to media, such as labels and/or tags that can be printed or otherwise processed with media processing devices, such as printers and/or scanners. Once the media is processed by the media processing device, the media can be placed on objects, such as packages, products for sale at retail, stock shelf labels, etc. A supply of media may be provided in various forms, such as a roll or stack, and the media may come in different sizes (e.g., different shapes, lengths and/or widths).

BRIEF DESCRIPTION OF THE SEVERAL VIEWS OF THE DRAWINGS

The novel features of the various aspects are set forth with particularity in the appended claims. Throughout the FIGS. like reference characters designate like or corresponding parts throughout the several views of the drawings. The described aspects, however, both as to organization and methods of operation, may be best understood by reference to the following description, taken in conjunction with the accompanying drawings in which:

Figure 1:
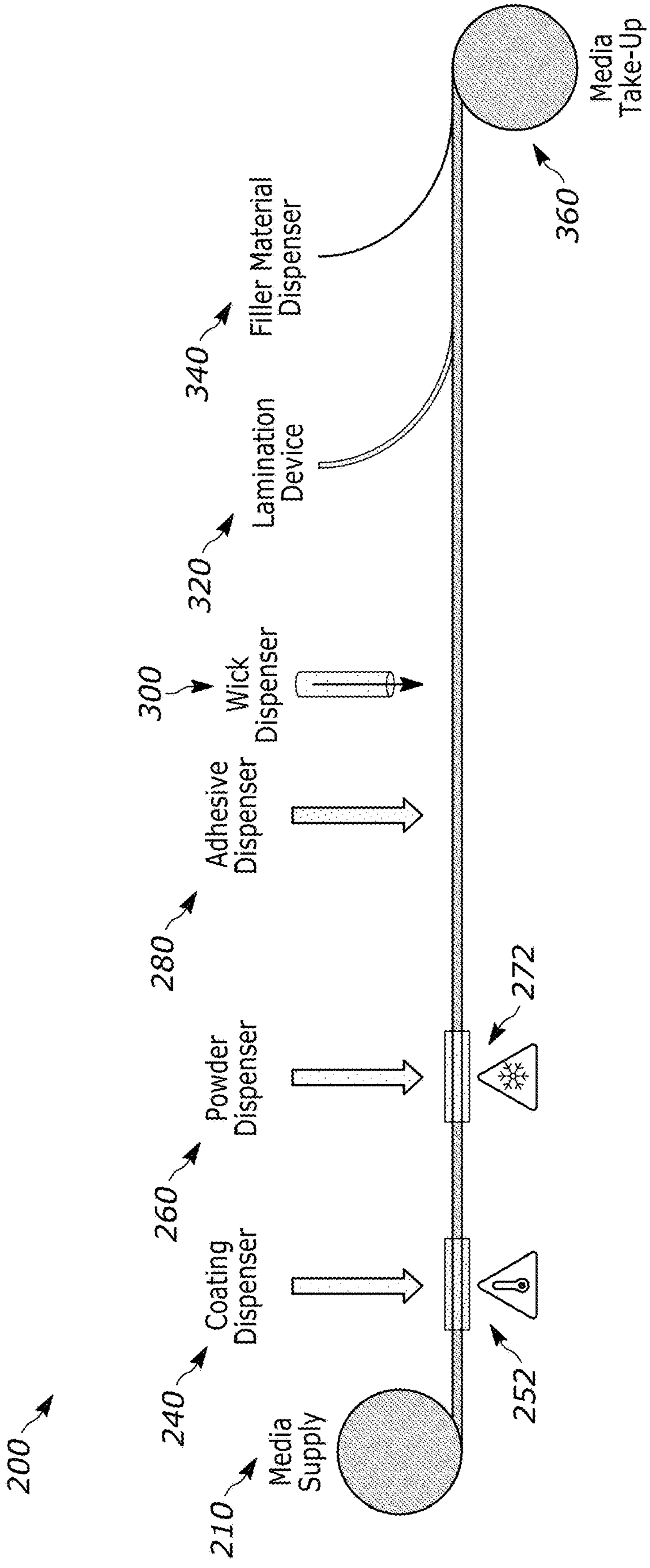
FIG. 1 illustrates a diagram of an example system to create an environmental sensor with powder dispensing, according to at least one aspect of the present disclosure.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

The following detailed description of example implementations refers to the accompanying drawings. The same reference numbers in different drawings may identify the same or similar elements.

Environmental sensors can be used (e.g. in media elements) to produce an observable effect in response to exposure to a predetermined environmental condition. Some example, observable effects are a change in color state (e.g., hue, transparency, darkness, etc.), a change in an electrical property, or a change a state of matter (e.g., viscosity or fluidity), in response to exposure to the predetermined environmental condition. As one example, an environmental sensor that uses chemical based indicators may be configured to produce an observable effect when a temperature of the environment is above a predetermined temperature threshold. In some aspects, an environmental sensor requires activation (e.g. by applying a force) before the observable effect can be produced by exposure to the predetermined environmental condition. If the environmental sensor is not activated, then the observable effect is not produced by the exposure to the predetermined environmental condition. This type of environmental sensor is considered an activatable environmental sensor. In some alternative aspects, an environmental sensor is active upon creation of the sensor without any further action being required to make the sensor active. This type of environmental sensor is considered a non-activatable environmental sensor.

An example activatable environmental sensor uses chemical based indicators which may be selectively activated at the end point of application. This process provides the benefit of allowing the environmental sensor (before activation) to be exposed to the predetermined environmental condition without producing the observable effect. The environmental sensor has a non-activated configuration where the media with the environmental sensor can be stored in the non-activated configuration without worrying about ruining the environmental sensor. For example, if the environmental sensor was designed to respond to a temperature above a response temperature, the media with the environmental sensor can be stored in the non-activated configuration at a temperature above the response temperature without ruining the environmental sensor. This avoids the need to maintain a strict cold chain for the temperature exposure sensors before the sensors are paired with products.

Some activatable environmental sensors rely on keeping indicator materials separate mechanically and then joining them together, e.g., by removing a barrier sheet or bringing two halves a clamshell structure into close contact. Prior to activation, the indicator does not react with relevant environmental stimulus. Another approach is to encapsulate the environmental indicator materials and activate them by rupturing the encapsulation (e.g. by a force) to release the indicator materials as described herein and in commonly owned and related applications: U.S. patent application, titled “PRINTER ACTIVATABLE ENVIRONMENTAL SENSING THROUGH CHEMICAL ENCAPSULATION”, application Ser. No. 18/369,498, filed Sep. 18, 2023; U.S. patent application, titled “MEDIA PROCESSING DEVICE AND COMPONENTS FOR ACTIVATABLE MEDIA PLATFORMS”, application Ser. No. 18/369,520, filed Sep. 18, 2023; U.S. patent application, titled “USE OF ENCAPSULATED POLAR PROTIC CHEMISTRIES FOR RFID TEMPERATURE MONITORING”, application Ser. No. 18/369,506, filed Sep. 18, 2023; U.S. patent application, titled “MEDIA CONSTRUCTION TO FACILITATE USE OF ACTIVATABLE PLATFORM”, application Ser. No. 18/369,536, filed Sep. 18, 2023; and U.S. patent application, titled “RIBBON FOR USE IN PRODUCING PRINTER ACTIVATABLE INDICATORS”, application Ser. No. 18/369,548, filed Sep. 18, 2023.

The encapsulated environmental indicator materials can be placed on media to form an activatable environmental sensor on the media. The environmental sensor can then be later activated with physical forces such as pressure, sheer, cutting or friction sufficient to rupture the encapsulation. The forces can be applied with a device, e.g. a media processing device, or by a user pinching environmental sensor by hand. In some aspects, heat is also applied to the environmental sensor for activation. In at least one aspect, the media can include a bursting additive (e.g. roughness and/or abrasiveness) to increase the ease of rupturing the indicator materials’ encapsulation and activate the environmental sensor.

The activable and non-activatable environmental sensors can be manufactured using various printing and dispensing techniques (e.g. rotary screen, flexo, gravure, etc.). There are occasions where certain indicator materials are not viable with some dispensing approaches. Often times, conventional methods of applying indicator materials may not be suitable for the product design that is needed to offer a functional environmental sensor that provides the functional performance desired. For example, common methods of dispensing indicator materials onto media require the use of a binder and/or carrier material to dispense the indicator material. This carrier material can later require the media to be heated (e.g. passed through an oven) to evaporate the carrier material. However, this heating process can ruin the environmental sensor if the predetermined environmental condition is exposure to a temperature threshold below the temperature required to evaporate the carrier material.

One solution is to dispense the indicator material in a dry powder form that does not require a carrier material. The ability to place indicator material for environmental sensors using powder dispensing may allow the creation of novel product solutions to be manufactured while avoiding issues associated with conventional application methods (e.g., such as requiring a carrier material) for printing/dispensing indicator materials such as process constraints, unwanted interactions, sedimentation of heavy particles, solubility restraints, drying issues, etc. For example, when dry powder dispensing is used, there is generally no carrier solvent that needs to be removed later. The dry powder dispensing means there is no need to pass the environmental sensor construction through an oven after placement of the indicator material. This can be an advantage since if the sensor is passed through an oven it can cause an undesired indicator response to occur due to the heat exposure.

Dry powder dispensing of the indicator material provides many advantages. The dry powder dispensing simplifies how an indicator material can be placed on an environmental sensor during manufacture. It also eliminates the need to formulate indicator materials with a binder, solvent, etc. in order to coat or dispense. As such, there is no need to find unique formulation components such as binder, dispersing agents, flow agents, carrier solvents etc. that are compatible with the active indicator material. This offers a much simpler solution without the complexity of possible interactions or impact on sensor performance caused by these materials. Additionally, dry powder dispensing eliminates the need to later remove the carrier solvent through drying typically done by passing through an oven. The powder dispensing can help provide a lower profile (less thick) sensor solution. It may also help to reduce cost since it can eliminate some additional components and processing steps. Furthermore, if an encapsulated indicator material (e.g., for an activatable environmental sensor) is applied with a carrier solvent it would need to be dried by passing through an oven which could negatively impact the encapsulation shell material and render the product compromised. The powder dispensing of encapsulated indicator material also avoids compromising the encapsulation shell material with solvents or other formulation ingredients.

In one general aspect, the present disclosure provides a process to manufacture an environmental sensor. The process includes dispensing a dry powder material to a first area on a media element, wherein the powder material comprises a plurality of microcapsules, each microcapsule encapsulating an environmental indicator material. The process further includes dispensing an adhesive to the media element. After the powder material and the adhesive have been dispensed to the media element, the powder material is in contact with the dispensed adhesive, and the adhesive holds the powder material in position.

In at least one aspect, the powder material is dispensed on the adhesive.

In at least one aspect, the adhesive is dispensed on the powder material.

In at least one aspect, the plurality of microcapsules release the environmental indicator material when ruptured. The environmental indicator material is configured, in response to exposure to a predetermined environmental condition, to change from an original state to a second state producing an observable effect. The plurality of microcapsules prevent an occurrence of the observable effect while the environmental indicator material is encapsulated and allow the occurrence of the observable effect when the environmental indicator material is exposed to the predetermined environmental condition after at least a portion of the plurality of microcapsules are ruptured. The process further comprises rupturing at least a portion of the plurality of microcapsules releasing the environmental indicator material.

In at least one aspect, the observable effect comprises at least one effect selected from the group consisting of a color state change, a change in transparency, a change in hue, a change in an electrical property, a change in conductivity, a change in capacitance, a movement of the environmental indicator material along a substrate, and combinations thereof.

In at least one aspect, the plurality of microcapsules prevent the observable effect by containing the environmental indicator material when it changes state.

In at least one aspect, the plurality of microcapsules prevent the observable effect by protecting the environmental indicator material from exposure to the predetermined environmental condition.

In at least one aspect, the predetermined environmental condition comprises at least one condition selected from the group consisting of temperature excursion above a predetermined temperature threshold for at least a predetermined amount of time, temperature excursion below a predetermined temperature for at least a predetermined amount of time, cumulative exposure to temperature over a time period above a predetermined threshold for at least a predetermined amount of time, exposure to a particular chemical, oxygen exposure, ammonia exposure, exposure to a particular chemical above a threshold concentration, exposure to a particular chemical above the threshold concentration for at least a predetermined amount of time, exposure to at least a predetermined amount of radiation of a particular type, ultraviolet light exposure, humidity exposure, exposure to a humidity level above a predetermined threshold, and exposure to a humidity level above a predetermined threshold for at least a predetermined amount of time.

In at least one aspect, the process further comprises applying a wick to the media element, wherein the wick covers at least a portion of a first area of the media element.

In at least one aspect, the powder material is dispensed on the wick and the adhesive is dispensed on the powder material.

In at least one aspect, the powder material is dispensed on the adhesive and the adhesive is dispensed on the wick.

In at least one aspect, the plurality of microcapsules release the environmental indicator material when ruptured, wherein the environmental indicator material is configured, in response to exposure to a predetermined environmental condition, to change from an original state to a second state producing an observable effect. The plurality of microcapsules prevent an occurrence of the observable effect while the environmental indicator material is encapsulated and allow the occurrence of the observable effect when the environmental indicator material is exposed to the predetermined environmental condition after at least a portion of the plurality of microcapsules are ruptured. The process further comprises rupturing at least a portion of the plurality of microcapsules releasing the environmental indicator material into contact with the wick.

In at least one aspect, the media element comprises an electrical component, wherein the wick covers at least a portion of the first area of the media element and at least a portion of the electrical component. In at least one aspect, the predetermined environmental condition comprises a temperature excursion above a predetermined temperature threshold. In response to exposure to a temperature above the predetermined threshold, the environmental indicator material changes from the original state to the second state producing the observable effect of changing an electrical property of the electrical component.

In at least one aspect, the electrical component is positioned outside of the first area. In response to exposure to the temperature above the predetermined threshold, the environmental indicator material moves along the wick to the electrical component producing the observable effect of changing the electrical property of the electrical component.

In at least one aspect, the predetermined environmental condition comprises a temperature excursion above a predetermined temperature threshold. In at least one aspect, in response to exposure to a temperature above the predetermined threshold, the environmental indicator material changes from the original state to the second state producing the observable effect of changing a color of at least a portion of the wick of the media element.

In at least one aspect, the process further comprises applying a filler material to the media element, wherein the filler material covers a second area on the media element outside of the first area. In at least one aspect, the filler material raises a thickness of the media element in the second area to be consistent with a thickness in the first area.

In at least one aspect, the filler material is applied to the media element through a filler material dispenser.

In at least one aspect, the process further comprises applying a lamination layer to the media element.

In at least one aspect, the filler material is attached after the lamination layer.

In at least one aspect, the filler material is attached prior to the lamination layer.

In at least one aspect, the process further comprises applying a lamination layer to the media element.

In at least one aspect, the lamination layer is applied to the media element through a lamination device.

In at least one aspect, an amount of powder material dispensed is between 1 mg to 5 mg.

In at least one aspect, an amount of adhesive dispensed is between 1 mg to 3 mg.

In at least one aspect, the adhesive comprises polyvinyl acetate or polyvinyl alcohol.

In at least one aspect, at least a portion of the plurality of microcapsules are ruptured based on a force greater than a predetermined threshold, the force being at least one of a pressure force, a shear force, a frictional force, or a cutting force applied to the media element.

In at least one aspect, the environmental indicator material comprises a polymer having side-chain crystallinity.

In at least one aspect, the environmental indicator material comprises an alkane wax.

In at least one aspect, the microcapsules comprise a gel.

In at least one aspect, the microcapsules comprise a protein.

In at least one aspect, the microcapsules comprise polyurea formaldehyde.

In at least one aspect, the microcapsules comprise polymelamine formaldehyde.

In at least one aspect, the microcapsules comprise a wax material.

In at least one aspect, the microcapsules comprise emulsions.

In at least one aspect, the microcapsules comprise a diameter length between 20 to 250 μm.

In at least one aspect, the powder material is dispensed from a dry powder dispenser.

In at least one aspect, the adhesive is dispensed from a liquid dispenser.

In another general aspect, the present disclosure provides a process for making an environmental sensor. The process comprises dispensing a coating to a first area on a media element, dispensing a powder material within the first area, and positioning a wick on the media element. The wick is positioned proximate the first area.

In at least one aspect, the wick covers at least a portion of the first area.

In at least one aspect, the media element comprises an electrical component, wherein at least a portion of the electrical component is positioned in the first area. The coating is dispensed on at least the portion of the electrical component. The powder material is conductive and the coating is nonconductive. The coating prevents the powder material from contacting the electrical component.

In at least one aspect, the process further comprises heating the media element prior to dispensing the coating, and cooling the media element prior to dispensing the powder material, causing the coating to solidify prior to dispensing the powder material.

In at least one aspect, the process further comprises heating a supply of the coating to above 45° C. and below 75° C., wherein an amount of coating is dispensed from the supply of the coating.

In at least one aspect, the media element is heated a threshold amount of time before dispensing the coating.

In at least one aspect, the media element is heated to above 35° C. and below 60° C.

In at least one aspect, the media element is cooled threshold amount of time before dispensing the coating.

In at least one aspect, the media element is cooled to below 35° C.

In at least one aspect, in response to exposure to a temperature above a predetermined threshold, the coating melts allowing the powder material to pass through the coating to contact the electrical component producing an observable effect of changing an electrical property of the electrical component.

In at least one aspect, at least a portion of the coating is pulled into the wick.

In at least one aspect, the media element comprises at least a portion of an electrical component position in a second area, wherein the wick covers at least the first area and at least a portion of the second area. The powder material is conductive. In response to exposure to a temperature above a predetermined threshold, the coating melts and carries the powdered material along the wick to the second area producing an observable effect of changing an electrical property of the electrical component.

In at least one aspect, the process further comprises dispensing adhesive to the media element before positioning the wick, wherein after the adhesive and the wick have been dispensed to the media element, the wick is in contact with the adhesive, and the adhesive holds the wick in position.

In at least one aspect, an amount of adhesive dispensed is between 1 mg to 3 mg.

In at least one aspect, the adhesive comprises polyvinyl acetate or polyvinyl alcohol.

In at least one aspect, the powder material is dispensed on the coating, and the wick is dispensed on the powder material.

In at least one aspect, the process further comprises applying a lamination layer to the media element, wherein the lamination layer is applied after the wick, coating, and powder material are placed on the media element.

In at least one aspect, the lamination layer is applied to the media element through a lamination device.

In at least one aspect, the process further comprises applying a filler material to the media element, wherein the filler material covers a second area on the media element outside of the first area, and wherein the filler material raises a thickness of the media element in the second area to be consistent with a thickness in the first area.

In at least one aspect, the filler material is applied to the media element through a filler material dispenser.

In at least one aspect, the filler material is attached after the lamination layer.

In at least one aspect, the filler material is attached before the lamination layer.

In at least one aspect, an amount of coating dispensed is between 1 mg to 5 mg.

In at least one aspect, an amount of powder material dispensed is between 1 mg to 5 mg.

In at least one aspect, the coating is made of a material comprising a polyacrylic material, an alkane material, a wax material, or combinations thereof.

In yet another general aspect, the present disclosure provides a system for dispensing a powder material on a media element. The system comprises a powder dispenser to dispense a predefined amount of dry powder material, a liquid dispenser to dispense a predefined amount of liquid, a wick dispenser to dispense a wick, and a control circuit communicable coupled to the powder dispenser, the liquid dispenser, and the wick dispenser. The control circuit comprising a processor and a memory, wherein the memory stores instructions executable by the processor to dispense, by the powder dispenser, the predefined amount of powder material at a first area of the media element, dispense, by the liquid dispenser, the predefined amount of liquid at the first area of the media element, and position, by the wick dispenser, the wick on the media element, wherein at least a portion of the wick covers at least a portion of the first area.

In at least one aspect, the liquid comprises an adhesive, and wherein the powder material is dispensed on the wick and the adhesive is dispensed on the powder material.

In at least one aspect, the liquid comprises an adhesive, and the powder material is dispensed on the adhesive and the wick is dispensed on the powder material.

In at least one aspect, the powder material comprises a plurality of microcapsules, each microcapsule encapsulating an environmental indicator material and releasing the environmental indicator material when ruptured. The environmental indicator material is configured, in response to exposure to a predetermined environmental condition, to change from an original state to a second state producing an observable effect. The plurality of microcapsules prevent an occurrence of the observable effect while the environmental indicator material is encapsulated, and allow the occurrence of the observable effect when the environmental indicator material is exposed to the predetermined environmental condition after at least a portion of the plurality of microcapsules are ruptured.

In at least one aspect, the liquid comprises a coating, and wherein the powder material is dispensed on the coating and the wick is dispensed on the powder material.

In at least one aspect, the media element comprises an electrical component. At least a portion of the electrical component is position in the first area. The coating is dispensed on at least the portion of the electrical component. In at least one aspect, the powder material is conductive and the coating is nonconductive. The coating prevents the powder material from contacting the electrical component.

In at least one aspect, in response to exposure to a temperature above a predetermined threshold, the coating melts allowing the powder material to pass through the coating to contact the electrical component producing an observable effect of changing an electrical property of the electrical component.

In at least one aspect, at least a portion of the coating is pulled into the wick.

In at least one aspect, the system further comprises a heater position proximate the coating dispenser and a chiller position proximate the powder dispenser. The memory further stores further instructions executable by the processor to heat the media element prior to dispensing the coating and cool the media element prior to dispensing the powder material.

In at least one aspect, the system further comprises a lamination device. The memory further stores instructions executable by the processor to apply a lamination layer to the media element. In at least one aspect, the lamination layer is applied after the wick, coating, and powder material are placed on the media element.

In at least one aspect, the system further comprises a filler material dispenser, wherein the memory further stores instructions executable by the processor to apply a filler material to the media element, wherein the filler material covers a second area on the media element outside of the first area, and wherein the filler material raises a thickness of the media element in the second area to be consistent with a thickness in the first area.

In at least one aspect, the filler material is attached after the lamination layer.

In at least one aspect, the filler material is attached prior to the lamination layer.

In at least one aspect, the system further comprises a supply roller positioned proximate an upstream end of the system, a take-up roller positioned proximate a downstream end of the system, and a media web spanning between the upstream end and the downstream end. The media web is attached to the supply roller and the take-up roller. The media web includes a plurality of media elements and the media element is one of the plurality of media elements. The media web is simultaneously unwound from the supply roller and wound around the take-up roller allowing a new media element of the plurality of media elements to be positioned proximate the powder dispenser, liquid dispenser, or wick dispenser.

In at least one aspect, the control circuit is further communicable coupled to a motor mechanically coupled to the take-up roller, and wherein the memory further stores instructions executable by the processor to rotate the take-up roller to move the media element into position below the powder dispenser, the liquid dispenser, or the wick dispenser.

Figure 2C:
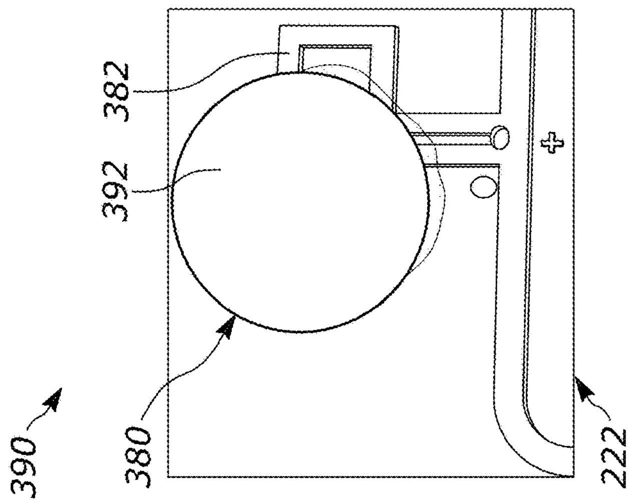
FIGS. 2A-C illustrate an example of creating an environmental sensor with powder dispensing, according to at least one aspect of the present disclosure.
Figure 2B:
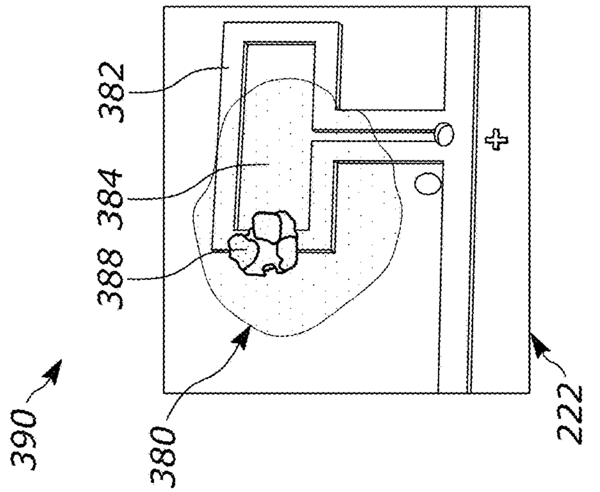
Figure 2A:
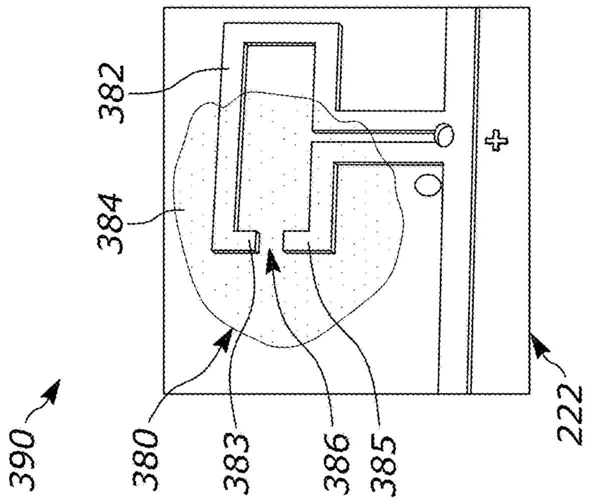

FIGS. 1-13 illustrate an example system 200 and method 600 to create an environmental sensor in a media element using powder dispensing. Some example media elements are labels, tags, wristbands, inlays, plastic cards, etc. FIG. 1 illustrates a diagram of the system 200 and FIGS. 2A-C illustrate an example environmental sensor 390 being created with the system 200, both according to at least one aspect of the present disclosure. The system 200 includes a media supply device 210, a coating dispenser 240, a heater 252, a particle dispenser 260, a chiller 272, an adhesive dispenser 280, a wick dispenser 300, a lamination device 320, a filler material dispenser 340, and a media take-up device 360. The media supply device 210 includes a media supply including a plurality of media elements. The media supply can be a spool of media elements on a web, a stack of media elements on a web, a stack of individual media elements, or any other group of media elements. One example of a media supply device 210 is discussed in regard to FIG. 4.

The system 200 is configured to place an environmental sensor (e.g. environmental sensor 390) on each media element and then collect the media elements in the media take-up device 360. The system 200 is configured to create a non-activatable environmental sensor. However, the order of operations and/or materials used in the system 200 can be changed to create an activatable environmental sensor as discussed in regard to FIGS. 17, 20, and 23.

A non-activatable environmental sensor starts in an initial sensor state and after exposure to a predetermined environmental condition transitions to a second sensor state producing an observable effect. The materials used in the environmental sensor depend on the type of environmental sensor. For example, the materials used may be selected to allow the environmental sensor to be responsive to the desired predetermined environmental condition. Some example predetermined environmental conditions are as follows: a temperature excursion above a predetermined temperature threshold for at least a predetermined amount of time, a temperature excursion below a predetermined temperature for at least a predetermined amount of time, a cumulative exposure to temperature over a time period above a predetermined threshold for at least a predetermined amount of time, an exposure to a particular chemical, an oxygen exposure, an ammonia exposure, an exposure to a particular chemical above a threshold concentration, an exposure to a particular chemical above the threshold concentration for at least a predetermined amount of time, an exposure to at least a predetermined amount of radiation of a particular type, an ultraviolet light exposure, a humidity exposure, an exposure to a humidity level above a predetermined threshold, an exposure to a humidity level above a predetermined threshold for at least a predetermined amount of time, and etc. After exposure to the desired predetermined environmental condition, the environmental sensor transitions from the initial sensor state to a second sensor state producing an observable effect. For example, an environmental indicator material in the environmental sensor can react with a temperature threshold to change color producing the observable effect of a color state change. Some example observable effects are one of a color state change, a change in transparency, a change in hue, a change in an electrical property, a change in conductivity, a change in capacitance, movement of a material along a substrate, etc., or combinations thereof. In at least one aspect, the observable effect can be a continuous transition; however, once a threshold is met, the environmental sensor would be considered to go from the initial sensor state to the second sensor state.

Referring to FIG. 1, the system 200 is configured to place an environmental sensor on media elements that are pulled from the media supply. In at least one aspect, the media supply device 210 includes the media supply. The media supply includes a plurality of media elements. Each media element includes a media substrate. In at least one aspect, the media substrates are a paper or polymer material, although it will be appreciated other substrate materials may be used. In some aspects, the media supply device 210 is positioned at an upstream end of the system 200.

The system 200 positions a media element proximate a coating dispenser 240 and a heater 252. The media element is one of the plurality of media elements in the media supply. The heater 252 heats the media element before a coating is applied to the media element. In at least one aspect, the media element is heated to between approximately 35° C. and 60° C. The heater 252 can be a heating pad, a forced air heater, or any other device configured to supply heat that can be used to heat the media element. In an alternative aspect, the media element is not heated by a heater 252. One example of a heater 252 is discussed in regard to FIG. 5.

In at least one aspect, a coating is heated to between 45° C. and 75° C. before dispersing an amount of the coating with the coating dispenser 240 to a sensor area on the media element. In this aspect, the coating is dispensed hot to the media element. In at least one aspect, the coating is not heated and the coating is dispensed at room temperature to the media element. In at least one aspect, between 1 mg and 5 mg of the coating is dispensed. In at least one aspect, the coating spreads on the media element after it is dispensed to cover the sensor area. Some example coatings include polyacrylic materials, alkane materials, and wax materials. In at least one aspect, the coating dispenser 240 is a liquid dispenser. One example of a coating dispenser 240 is discussed in regard to FIG. 5.

After the coating is dispensed, the system 200 positions the media element proximate the powder dispenser 260 and the chiller 272. The coating is allowed to cool and solidify before any powder material (e.g. material particles) is dispensed from the powder dispenser 260. In at least one aspect, the media element and coating cool to below a predetermined threshold before the powder material is dispersed. In an alternative aspect, the media element and coating cool for a predetermined amount of time before the powder material is dispersed. In at least one aspect, a chiller 272 directly cools the media element and coating. In an alternative aspect, the media element cools without the use of a chiller 272. The chiller 272 could be a forced air cooler, a chilling plate, a fan, or any other device that can be used to remove heat from the media element and coating. One example of a chiller 272 is discussed in regard to FIG. 6.

Once the coating on the media element has cooled and solidified, the powder dispenser 260 dispenses an amount of dry powder material to the sensor area. In at least one aspect, the powder dispenser 260 dispenses between 1 mg to 5 mg of the dry powder material. In at least one aspect, the dry powder material includes solid particles (e.g. copper flakes). In an alternative aspect, the dry powder material includes encapsulating particles. For example, each particle in the dry powder material can encapsulate an environmental indicator material as described in regard to FIGS. 14-25. One example of a powder dispenser 260 is discussed in regard to FIG. 6.

After the dry powder material is dispensed, the system 200 positions the media element proximate an adhesive dispenser 280. In at least one aspect, the adhesive dispenser 280 dispenses an adhesive to the sensor area. In some aspects, the adhesive is positioned on top of the powder material. In some alternative aspects, the adhesive is positioned outside of the powder material and still inside of the sensor area. In at least one alternative aspect, the adhesive dispenser 280 dispenses the adhesive to an area outside of the sensor area. In at least one aspect, between 1 mg and 3 mg of an adhesive is dispensed. Some example adhesives include polyvinyl acetate, polyvinyl alcohol, and any other similar adhesive. In at least one aspect, the adhesive dispenser 280 is a liquid dispenser. In at least one aspect, the adhesive is dispensed hot at a temperature between 30° C. and 100° C. In an alternative aspect, the adhesive is dispensed at room temperature. One example of an adhesive dispenser 280 is discussed in regard to FIG. 7.

After the adhesive is dispensed, the system 200 positions the media element proximate a wick dispenser 300. The wick dispenser 300 is configured to pull a wick from a supply of wicks and position the wick on the media element. The wick is positioned such that the wick is in contact with the adhesive and the adhesive holds the wick in position relative to the media element. In at least one aspect, the wick covers the sensor area. In at least one alternative aspect, the wick covers at least a portion of the sensor area and a portion of a second area outside of the sensor area. In this aspect, the adhesive could be inside the sensor area or outside of the sensor area. The wick is positioned such that the wick is in contact with the dry powder material on the media element. For example, the wick can be positioned on top of the dry powder material. One example of a wick dispenser 300 is discussed in regard to FIG. 8.

After the wick is dispensed, the system 200 positions the media element proximate a lamination device 320. The lamination device adds a lamination layer to the media element. The lamination layer is a laminate and can be made of a plastic material. In at least one aspect, the lamination layer covers the sensor area and wick. In at least one aspect, the lamination layer holds the powder material, adhesive, and wick of the environmental sensor in position. The lamination layer can cover the entire surface of the media element or only an area within the surface of the media element. One example of a lamination device 320 is discussed in regard to FIG. 9.

In some aspects after the lamination layer is applied, the system 200 positions the media element proximate a filler material dispenser 340. In this aspect, a filler material is applied on top of the lamination layer.

In some alternative aspects, the filler material is applied to the media element before the lamination layer. In this aspect, the system 200 positions the media element proximate a filler material device after the wick is dispensed. In this aspect, the filler material dispenser 340 applies filler material to the media element and then the system 200 positions the system proximate the lamination device 320 such that the lamination device 320 applies a lamination layer over the filler material.

When a filler material is applied to the media element, the filler material can cover an area outside of the sensor area and provides a generally uniform thickness to the media element. For example, the powder material and wick will have a thickness on the media element and the filler material can be used to make the thickness of the media element outside of the sensor area and wick the same thickness as the sensor area. Stated another way, the filler material can be used to fill the gap between layers formed by the thickness of the environmental sensor so that a thickness of the media element is uniform. In at least one aspect, the filler material is a paper or polymer material. In some aspects, the paper or polymer material can have an adhesive that allows the filler material to stick to the media element. In at least one aspect, the size and type of filler material is based on the type of environmental sensor attached to the media element. One example of a filler material dispenser 340 is discussed in regard to FIG. 10.

Once the environmental sensor is complete and a filler material is added if desired, the media element can be collected by a media take-up device 360. In at least one aspect, the media take-up device 360 is positioned at the downstream end of the system 200. In some aspects, media elements can be removed from the media supply 210 while other media elements are simultaneously taken into the take-up device 360. The media take-up device 360 includes a media holder that is configured to hold a plurality of media elements with environmental sensors. The media take-up device 360 can be configured to collect different types of media elements. For example, a spool of media elements on a web, a stack of media elements on a web, a stack of individual media elements, or any other group of media elements. One example of a media take-up device 360 is discussed in regard to FIG. 11.

In at least one aspect, the filler material dispenser 340 can work with the media take-up device 360 to apply the filler material as the media elements are collected. An example of this process is discussed in regard to FIG. 10.

FIGS. 2A-C illustrates an example environmental sensor 390 being applied to a sensor area 380 on a media element 222 with the system 200. In at least one aspect, the media element 222 includes a printable substrate. The media element 222 has an electrical component 382 on and/or in the media element 222 and at least a portion of the electrical component 382 is within the sensor area 380. In some examples the electrical component 382 is made with a metal (e.g., copper, aluminum, silver, gold), although other conductive materials may also be used. The electrical component 382 has a gap 386 in the sensor area 380 and the gap 386 prevents current from flowing between location 383 and location 385 of the electrical component. FIG. 2A illustrates a coating 384 that was applied to the sensor area 380 by the coating dispenser 240. Between 1 mg to 5 mg of the coating 384 was applied to the media element 222 with the coating dispenser 240. The coating 384 was applied at a temperature between 45° C. and 75° C. while the media element 222 was heated to a temperature between 35° C. and 60° C. The coating 384 is a nonconductive coating that covers the gap 386 in the electrical component. In at least one aspect, the electrical component is a radio frequency identification (RFID) tag or an near field communication (NFC) tag).

After the coating 384 is applied to the sensor area 380, the coating 384 is allowed to cool and solidify. For example, the coating 384 is allowed to cool for a predefined period of time. In at least one aspect, the coating 384 is cooled by a chiller 272. In an alternative aspect, the coating 384 is cooled without a chiller 272 and relies on the ambient temperature for cooling. After the coating 284 has solidified, the powder dispenser 260 dispenses a powder material 388 to the sensor area 380. The powder material 388 is a conductive material (e.g. copper flakes). Referring to FIG. 2B, the powder material 388 is applied over the gap 386 such that the powder material 388 spans the entire gap 386 from location 383 to location 385. The coating 384 prevents the powder material 388 from contacting the electrical component 382.

After the powder material 388 is applied, an adhesive is applied to the sensor area 380. In at least one aspect, the adhesive is positioned outside of the powder material 388. In an alternative aspect, the adhesive is applied on top of the powder material 388. Referring to FIG. 2C, a wick 392 is position on top of the powder material 388 and coating 384. The wick 392 is in contact with the adhesive and the adhesive holds the wick in position relative to the media element 222. After the wick 392 is positioned, a lamination layer is applied over the media element 222 to hold the wick 392 and powder material 388 in position, which completes the environmental sensor 390.

The environmental sensor 390 is a non-activatable temperature sensitive environmental sensor. As such, the predetermined environmental condition of the environmental sensor 390 is exposure to a temperature excursion above a predetermined temperature threshold for at least a predetermined amount of time. The observable effect of the environmental sensor 390 is a change in an electrical property. As such, an electrical property of the electrical component (e.g. an RFID tag) is a first value before exposure to the predetermined environmental condition and a second value after exposure to the predetermined environmental condition. Stated another way, the environmental sensor 390 is in an initial sensor state with the electrical property of the electrical component being a first value before exposure to the predetermined environmental condition. Then after exposure to the predetermined environmental condition the environmental sensor 390 is in a second sensor state where the electrical property of the electrical component is a second value different from the first value.

When the environmental sensor 390 is exposed to a temperature above the predetermined temperature threshold, the coating 384 melts allowing the powder material 388 to pass through the coating 384. The coating 384 is wicked into the wick 392 allowing the powder material 388 to contact the electrical component 382 and bridge the gap 386 between locations 383 and 385. The powder material 388 allows current to flow between locations 383 and 385, which changes an electrical property of the electrical component producing the observable effect. In at least one aspect, the electrical component is an RFID tag and the electrical property that is changed is the value that is read from the RFID tag.

In at least one aspect, the predetermined temperature threshold is between −25° C. and 70° C. In an alternative aspect, the predetermined temperature threshold is between 5° C. and 70° C. In yet another alternative aspect, the predetermined temperature threshold is between −5° C. and 5° C. For example, the predetermined temperature threshold is preferably between −1° C. and 1° C. for thaw type environmental sensor indicators. In yet another alternative aspect, the predetermined temperature threshold is between 5° C. and 15° C. For example, the predetermined temperature threshold is preferably between 8° C. and 12° C. for some refrigeration type environmental sensor indicators. The predetermined temperature threshold can be within a specific range for a type of environmental sensor indicator. Stated another way, the predetermined temperature threshold is based on the type of environmental sensor indicator.

Environmental sensor 390 is one non-limiting example of an environmental sensor. For example, another environmental sensor (similar to environmental sensor 390) could be designed to have a coating move the powder material along a wick to a location on the media element to produce an observable effect. The media element could have at least a portion of an electrical component position in a first area. In a second area on the media element a coating can be dispensed and a powder material can be dispensed on the coating. A wick can be positioned such that the wick covers at least the second area and at least a portion of the first area. When the media element is exposed to a temperature above the predetermined temperature threshold, the coating melts and carries the powdered material along the wick to the second area producing an observable effect of changing an electrical property of the electrical component.

The environmental sensor 390 is an example of a non-activatable environmental sensor. As such, the environmental sensor 390 will automatically react to exposure to the predetermined environmental condition. As such, it is desirable that the environmental sensor 390 be used in conditions where the predetermined environmental condition is not easily experienced during storage of the environmental sensor 390, since this would allow the environmental sensor to be placed in the second sensor state prior to being used. Once in the second sensor state, the environmental sensor would no longer be usable to detect the predetermined environmental condition. For example, if the predetermined environmental condition was exposure above a temperature threshold, then it is desirable for the temperature threshold to be higher than normally occurring ambient temperatures.

Figure 3:
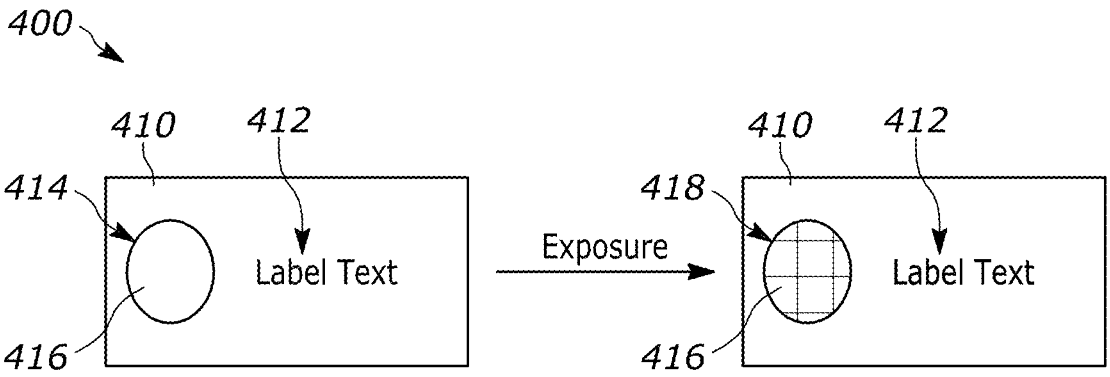
FIG. 3 is a diagram illustrating a media element with an environmental sensor before and after exposure to a predetermined environmental condition, according to at least one aspect of the present disclosure.

FIG. 3 is a diagram 400 illustrating a media element 410 with a non-activatable environmental sensor 416 before and after exposure to a predetermined environmental condition, according to at least one aspect of the present disclosure. In at least one aspect, the media element 410 and environmental sensor 416 are substantially similar to media element 222 and environmental sensor 390, respectively. The media element 410 includes label text 412 and an environmental sensor 416. In at least one aspect, the environmental sensor 416 is substantially similar to environmental sensor 390. Since the environmental sensor 416 is non-activatable, the environmental sensor 416 will automatically react to exposure to the predetermined environmental condition. The environmental sensor 416 begins in an initial sensor state 414. When the environmental sensor 416 is exposed to the predetermined environmental condition, the environmental sensor 416 transitions from the initial sensor state 414 to a second sensor state 418 producing an observable effect.

Figure 4:
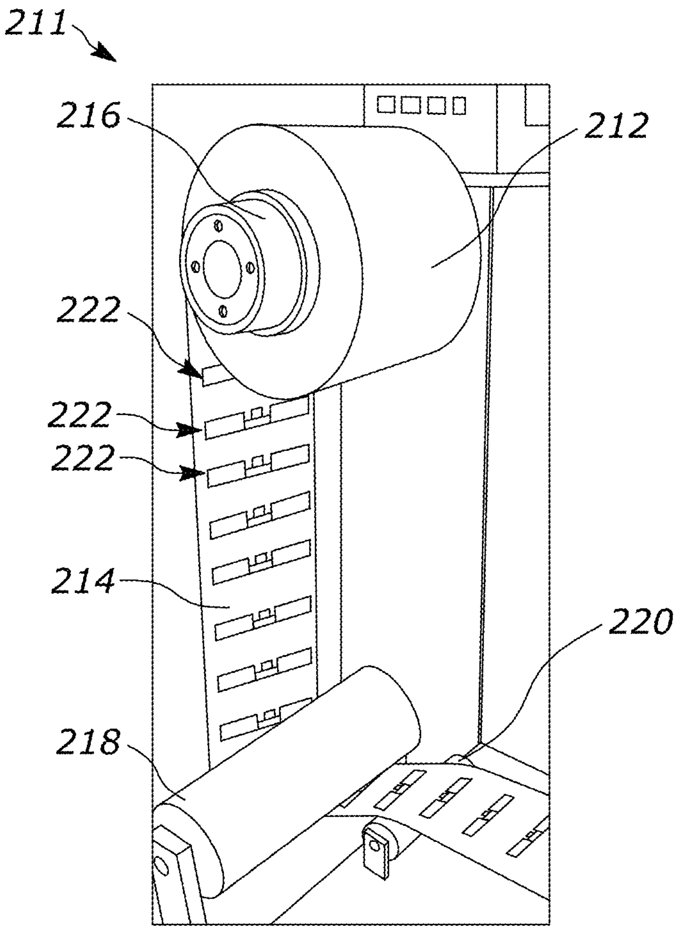
FIG. 4 illustrates an example media supply device for the system of FIG. 1, according to at least one aspect of the present disclosure.

FIGS. 4 through 11 illustrate some examples devices 210, 240, 252, 260, 272, 280, 300, 320, 340, and 360 of the system 200 being used to place an environmental sensor 390 on media elements 222. FIG. 4 illustrates a media supply device 211 that can be used as the media supply device 210 for the system 200, according to at least one aspect of the present disclosure. The media supply device 211 includes a supply roller 216, a first guide roller 218, and a second guide roller 220. A media supply web 212 is attached to the supply roller 216 and a media web 214 extends from the media supply web 212. The media web 214 extends around the first guide roller 218 and the second guide roller 220. The media web 214 then extends from the second guide roller 220 and to the devices 240, 252, 260, 272, 280, 300, 320, and 340 of the system 200. The media web 214 ends at the media take-up device 360.

Figure 11:
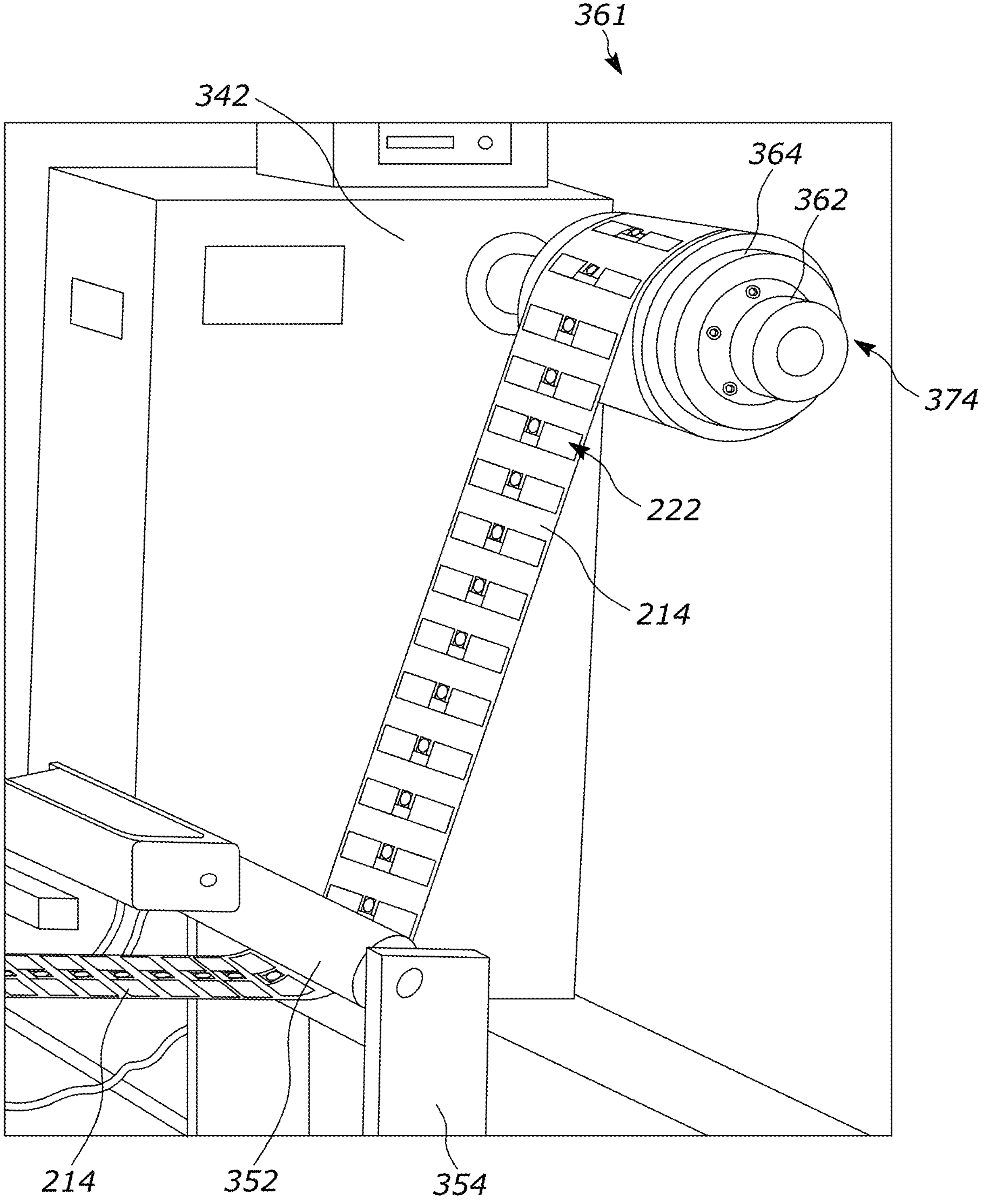
FIG. 11 illustrates an example take up device for the system of FIG. 1, according to at least one aspect of the present disclosure.

Referring to FIG. 11, the media take-up device 360 includes a third guide roller 352 and a take-up roller 362. The media web 214 extends around the third guide roller 352 and then to the take-up roller 362. As media elements are moved through the system 200, the media elements 222 with environmental sensors collect at the media take-up device 360. For example, the media web 214 spools on the take-up roller 362 forming a collection 364 of completed media elements 222. The collection 374 of completed media elements 222 can later be used as a media supply for printing on the media elements 222.

In at least one aspect, the media supply roller 216 is mechanically coupled to a supply motor and the media take-up roller 362 is mechanically coupled to a take-up motor. As such the supply motor controls the rotation of the media supply roller 216 and the take-up motor controls the rotation of the media take-up roller 362. Rotation of the media supply roller 216 in a first direction causes media elements 222 to unspool from the media supply web 212 on the media supply roller 216 and rotation in a second direction causes the media elements 222 to spool onto the media supply web 212. Similarly, rotation of the media take-up roller 362 in a first direction causes media elements 222 to spool onto the media take-up roller 362 and rotation in a second direction causes the media elements 222 to unspool from the media take-up roller 362. As such, the supply motor and the take-up motor rotate cause the media elements 222 to unspool from the media supply roller 216 pass through the different devices 240, 252, 260, 272, 280, 300, 320, and 340 of the system 200 and spool onto the media take-up roller 362. By rotating each motor in one direction the media elements 222 can be moved forward through the system 200 and by rotation the each motor in a different direction the media elements 222 can be moved backward through the system 200.

Figure 5:
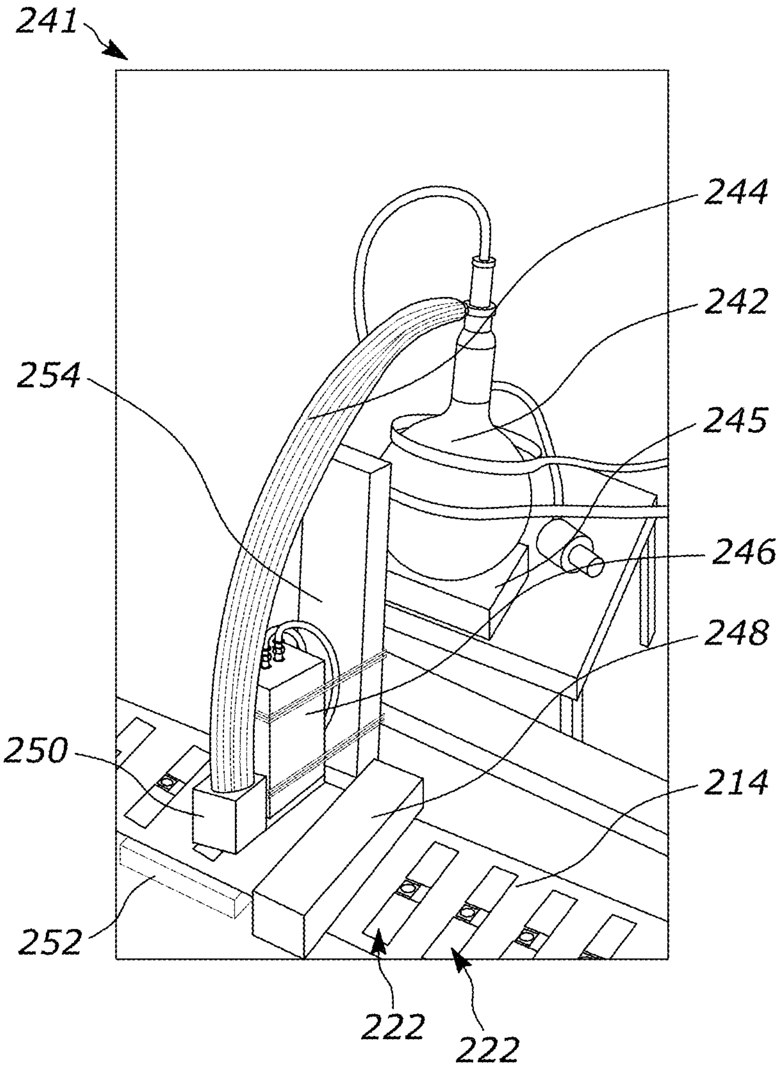
FIG. 5 illustrates an example coating dispenser for the system of FIG. 1, according to at least one aspect of the present disclosure.

A media element 222 is moved from the media supply 212 as discussed above and position proximate a heater 252 and a coating dispenser 240. FIG. 5 illustrates a coating dispenser 241 that can be used as the coating dispenser 240 for the system 200, according to at least one aspect of the present disclosure. In at least one aspect, the coating dispenser 241 is a liquid dispenser. The coating dispenser 241 includes a coating supply 242, an actuator 246, a supply line 244, a heater body 250, a fluid body assembly (not visible), and a nozzle (not visible). The fluid body assembly is coupled to the actuator 246. The heater body 250 surrounds the fluid body assembly and can heat any fluid that enters the fluid body assembly. The nozzle is attached to the fluid body assembly opposite the actuator 246. The supply line 244 fluidly couples the coating supply 242 with the fluid body assembly. The actuator 246 controls the fluid body assembly to either stop or allow the flow of the coating through the nozzle. In at least one aspect, the actuator 246 controls an actuator valve in the fluid body assembly.

The coating flows from the coating supply 242 through the supply line 244 and into the fluid body assembly. In at least one aspect, the coating flows through the supply line 244 at a constant pressure. In at least one aspect, the coating (e.g. coating 384 of FIG. 2A) in the coating supply 242 is heated to a temperature between a predetermined temperature range and pumped into the actuator 246. For example, the coating supply 242 can be heated by a heater 245 heater that heats the coating. In at least one aspect, the predetermined temperature range is 45° C. to 75° C. In an alternative aspect, the coating supply is pumped into the fluid body assembly at room temperature.

The coating is moved through the supply line 244 and into the fluid body assembly. The heater body 250 surrounds the fluid body assembly. The coating enters the fluid body assembly and, in some aspects, is heated by the heater body 250 to a temperature between 45° C. to 75° C. The coating is dispersed at an appropriate temperature, where in some aspects the coating is heated and in other aspects the coating does not require heating. The actuator 246 controls the dispensing of the coating and allows the coating to flow through a nozzle and onto a media element 222 positioned proximate the nozzle. The actuator 246 can control a valve that opens and closes to allow the coating to be dispensed through the nozzle only when desired. For example, the coating can be pumped into the fluid body assembly at a pressure and the pressure allows the coating to exit through the nozzle when the valve is opened. The actuator 246 controls the valve to control the amount of coating that is dispensed. The coating flows from the coating supply 242 through the supply line 244 through the fluid body assembly and out of the nozzle to the media element 222. In at least one aspect, the amount of coating dispersed is between 1 milligram and 5 milligrams. Some example coatings include polyacrylic materials, alkane materials, and wax materials.

The coating dispenser 241 can be supported by brackets 248 and 254. For example, the actuator 246 can be attached to bracket 254. The nozzle of the coating dispenser 241 is positioned such that a media element is moved below the nozzle. In at least one aspect, the coating dispenser 241 is not moved during the dispensing operation. In an alternative aspect, the coating dispenser 241 is moved relative to the media element 222 during the dispensing operation. This would allow the nozzle to be moved to different locations on the media element 222 to dispense coating to different locations on the media element 222.

In at least one aspect, the coating dispenser 240 is a liquid dispenser. A Nordson PICO Pμlse Jetting system is an example liquid dispenser that could be used for the coating dispenser 240. However, any such similar dispenser could be used.

As discussed previously in regard to FIG. 1, before the coating is dispersed, the media element 222 can be heated. In at least one aspect, the media element 222 is heated to a temperature between 35° C. and 60° C. Referring to FIG. 5, the heater 252 is illustrated as a heating pad that the media element 222 rests on before and during dispensing of the coating by the coating dispenser 240. As discussed previously, different heaters 252 could be used to heat the media element. In at least one aspect, the heating of the media element 222 can allow the coating to spread evenly in the area the coating is dispensed.

Referring to FIG. 2A, a coating dispenser such as the coating dispenser 241 can be used to apply the coating 384 to the media element 222. For example, the sensor area 380 can be positioned below the nozzle of the coating dispenser 241 and the actuator 246 can dispense the heated coating 384 to the sensor area 380.

Figure 6:
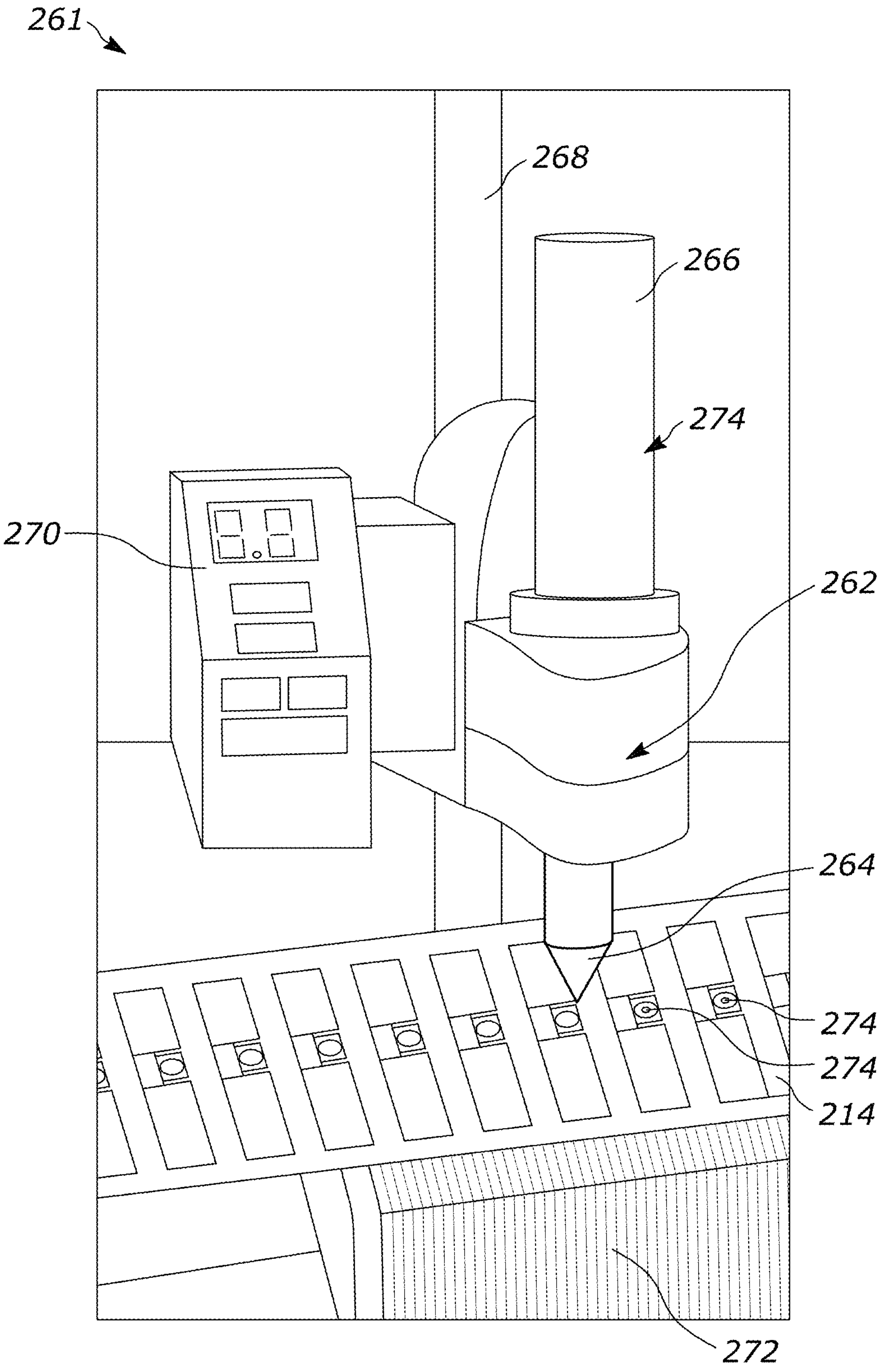
FIG. 6 illustrates an example powder dispenser for the system of FIG. 1, according to at least one aspect of the present disclosure.

After the coating is dispensed, the media element 222 is moved from the media coating dispenser 240 and position proximate a chiller 272 and a powder dispenser 260. FIG. 6 illustrates a powder dispenser 261 that can be used as the powder dispenser 260 for the system 200, according to at least one aspect of the present disclosure. The powder dispenser 261 includes a powder supply 266, a control system 270, a housing 262, a nozzle 264 and a support bar 268. The housing 262 is coupled to the support bar 268. The nozzle 264 and powder supply 266 are attached to the housing 262. The powder material 274 (e.g. powder material 388) travels from the powder supply 266 through the housing 262 and out of the nozzle 264 during a dispensing operation. In at least one aspect, the powder supply 266 is attached to the top of the housing 262 and force of gravity allows the powder material 274 in the powder supply 266 to enter the housing 262.

In at least one aspect, the control system 270 is programmable to specify an amount of the powder material 274 that is desired to be dispensed as well as how often to dispense the powder material 274. In at least one aspect, the amount of the powder material 274 dispensed is between 1 mg to 5 mg for each media element 222. In at least one aspect, the control system 270 is coupled to a controller (e.g. control circuit 500, see FIG. 12) for automation.

Inside the housing 262 the desired amount of the powder material 274 is gathered to be dispensed. One example of this gathering process, is to have multiple gears within the housing 262 that are used to sequentially collect smaller amounts of the powder material 274 until the desired amount is gathered at the bottom of the housing 262 toward the nozzle 264 to be dispensed.

When desired, the amount of the powder material 274 exits the housing 262 through the nozzle 264 and onto the media element 222. In at least one aspect, the nozzle 264 is coupled to the bottom of the housing 262. The media element 222 is positioned such that the nozzle 264 dispenses the powder material 274 onto the desired location on the media element 222.

In at least one aspect, the housing is manually fixed in placed relative to the support bar 268. In at least one alternative aspect, a motor within the housing 262 allows the entire housing 262 to be moved up and down the support bar 268.

FIG. 6 shows the media web 214 extending between the powder dispenser 261 and a chiller 272. In FIG. 6, the chiller 272 is illustrated as a chilling pad that the media element 222 rests on to solidify the previously applied coating. However, as discussed previously, the chiller 272 could be any device to allow the media element 222 to cool and in some aspects a chiller 272 is not used and the ambient temperature is used to solidify the coating.

Referring to FIG. 2B, a powder dispenser such as the powder dispenser 261 can be used to apply the powder material 388 to the media element 222. For example, the sensor area 380 can be positioned below the nozzle 264 of the powder dispenser 261 and the powder dispenser 261 can dispense the powder material 388 to the sensor area 380. In this aspect, referring to FIG. 6, the powder supply 266 holds the powder material 274 is powder material 388 and the powder dispenser 261 dispenses an amount of the powder material 388 on media elements 222 as shown in FIG. 2B.

One example powder dispensing system that could be used for the powder dispenser 260 is an XQ Instruments Solids Dispenser SDB-1. However, any such similar dry powder dispenser could be used.

Figure 7:
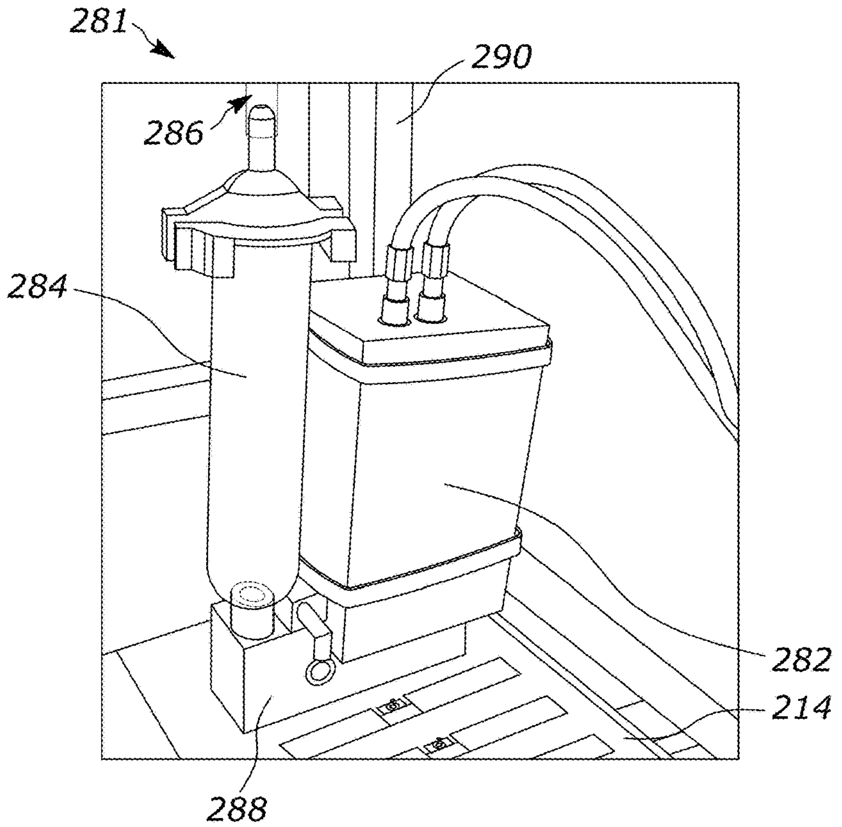
FIG. 7 illustrates an example adhesive dispenser for the system of FIG. 1, according to at least one aspect of the present disclosure.

After the powder material 274 is dispensed, the media element 222 is moved from the powder dispenser 260 and position proximate an adhesive dispenser 280. FIG. 7 illustrates an adhesive dispenser 281 that can be used as the adhesive dispenser 280 for the system 200, according to at least one aspect of the present disclosure. The adhesive dispenser 281 is substantially similar to the coating dispenser 241 and, for the sake of brevity, not all similarities will be discussed in detail.

The adhesive dispenser 281 includes a syringe barrel 284, an actuator 282, a pressure line 286, a heater body 288, a fluid body assembly (not visible), and a nozzle (not visible). The fluid body assembly is coupled to the actuator 282. The heater body 288 surrounds the fluid body assembly and can heat any fluid that enters the fluid body assembly. The nozzle is attached to the fluid body assembly opposite the actuator 282. The syringe barrel 284 is attached to the actuator 282 and fluidly coupled to the fluid body assembly. The actuator 282 controls the fluid body assembly to either stop or allow the flow of the adhesive through the nozzle. In at least one aspect, the actuator 282 controls an actuator valve in the fluid body assembly.

The syringe barrel 284 allows an adhesive housed in the syringe barrel 284 to enter the fluid body assembly. Some example adhesives include polyvinyl acetate, polyvinyl alcohol, and any other similar adhesive. The pressure line 286 is attached to the syringe barrel 284 and applies a constant pressure to the syringe barrel 284 that pushes the adhesive in the syringe barrel 284 into the actuator 282. The adhesive enters the actuator 282 due to the pressure.

In at least one aspect, the heater body 288 heats the adhesive in the actuator 282 to a temperature between 30° C. and 100° C. This ensures that the adhesive is dispersed at the appropriate temperature. In an alternative aspect, the adhesive is not heated by the heater body 288 and the adhesive is dispensed at room temperature.

The actuator 282 controls the dispensing of the adhesive and allows the adhesive to flow through the nozzle and onto a media element 222 positioned proximate the nozzle. The actuator 282 can control a valve that opens and closes to allow the adhesive to be dispensed through the nozzle only when desired. For example, the adhesive is pressed into the fluid body assembly at a pressure and the pressure allows the coating to exit through the nozzle when the valve is opened. The actuator 282 controls the valve to control the amount of adhesive that is dispensed. The adhesive flows from the syringe barrel 284 through the fluid body assembly and out of the nozzle to the media element 222. In at least one aspect, the amount of coating dispersed is between 1 milligram and 3 milligrams.

The adhesive dispenser 281 can be supported by bracket 290. For example, the actuator 282 can be attached to bracket 290. The nozzle of the adhesive dispenser 281 is positioned such that a media element is moved below the nozzle. In at least one aspect, the adhesive dispenser 281 is not moved during the dispensing operation. In an alternative aspect, the adhesive dispenser 281 is moved relative to the media element 222 during the dispensing operation. This would allow the nozzle to be moved to different locations on the media element 222 to dispense coating to different locations on the media element 222.

Referring to FIG. 7, the media web 214 is moved beneath the nozzle of the adhesive dispenser 281. The media element 222 is positioned such that an amount of adhesive can be dispensed onto the media element. In some aspects, the adhesive is positioned on top of the powder material 274. In some alternative aspects, the adhesive is positioned outside of the powder material 274 and still inside of the sensor area. In at least one alternative aspect, the adhesive dispenser 280 dispenses the adhesive to an area outside of the sensor area.

In at least one aspect, the adhesive dispenser 280 is a liquid dispenser. A Nordson PICO Pμlse Jetting system is an example liquid dispenser that could be used for the adhesive dispenser 280. However, any such similar dispenser could be used.

Figure 8:
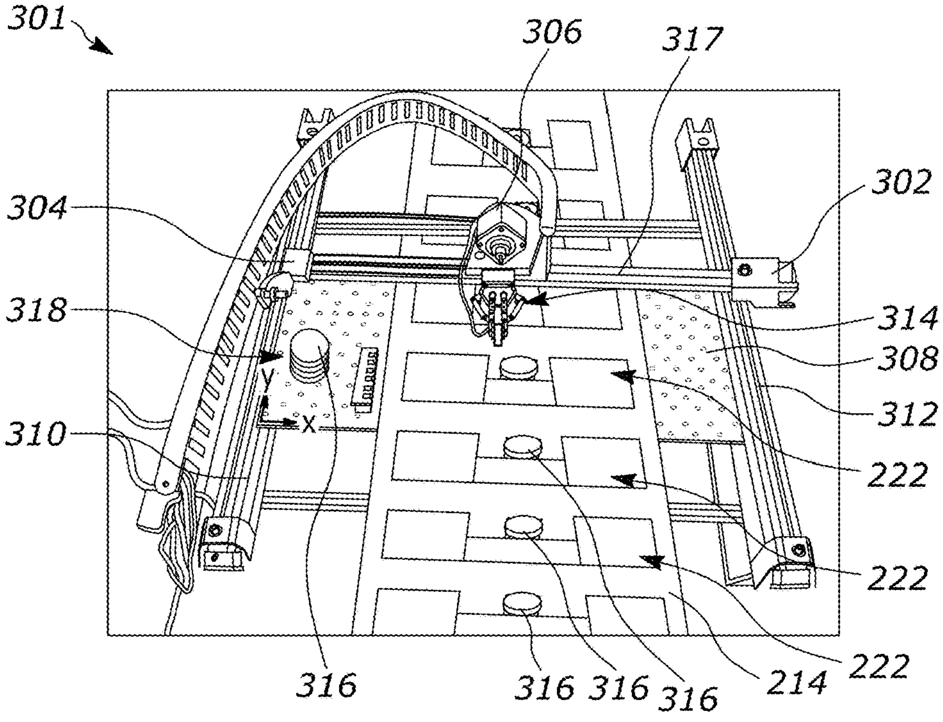
FIG. 8 illustrates an example wick dispenser for the system of FIG. 1, according to at least one aspect of the present disclosure.

After the adhesive is dispensed, the media element 222 is moved from the adhesive dispenser 280 and position proximate a wick dispenser 300. FIG. 8 illustrates a wick dispenser 301 that can be used as the wick dispenser 300 for the system 200, according to at least one aspect of the present disclosure. The wick dispenser 301 includes a grasper 314, a bed 308, first bottom support 310, a second bottom support 312, a cross support 317, a first y-motor 304, a second y-motor 302, an x-motor 306, and a vertical motor (not shown).

The bed 308 is attached to the first bottom support 310 and the second bottom support 312. The first bottom support 310 and the second bottom support 312 extend parallel to each other along the y-axis. The first y-motor 304 and the second y-motor 302 are coupled to the cross support 317. The first y-motor 304 is coupled to the first bottom support 310 and the second y-motor 302 is coupled to the second bottom support 312. The first y-motor 304 and the second y-motor 302 operation together to move the cross support 317 in a positive y-direction or a negative y-direction. The cross support 317 extends along the x-axis between the first bottom support 310 and the second bottom support 312. The x-motor 306 and grasper 314 are coupled to the cross support 317. The grasper 314 is also coupled to the x-motor 306 and a vertical motor. The x-motor 306 is configured to move the grasper 314 along the cross support 317. The vertical motor is configured to move the grasper 314 toward and away from the bed 308. The grasper 314 is configured to open and close to grasp objects. As discussed above, the x-motor 306 positions the grasper 314 on the x-axis, the first y-motor 304 and the second y-motor 302 position the grasper 314 on the y-axis, and the vertical motor positions the grasper 314 a specified distance away from the bed 308.

The media web 214 passes between the grasper 314 and the bed 308 of the wick dispenser 301. The system 200 positions a media element 222 of the media web 214 on the bed 308. The grasper 314 is moved and positioned to grasp a wick 316 from a wick supply 318. The grasper 314 then positions the wick 316 on the media element 222 in the sensor area. For example, the wick 316 can be positioned on top of the powder material 274 such that the wick 316 is in contact with the dispensed adhesive. In at least one aspect, the dispensed adhesive holds the wick 316 in position.

In at least one aspect, the wick dispenser 300 is a pick-n-place device. The wick dispenser 301 is an example of a pick-n-place device. In at least one alternative aspect, the wick dispenser 300 is a label applicator. In yet another alternative aspect, the wick dispenser 300 is any device that can be used to position a wick at a location on the media element.

Figure 9:
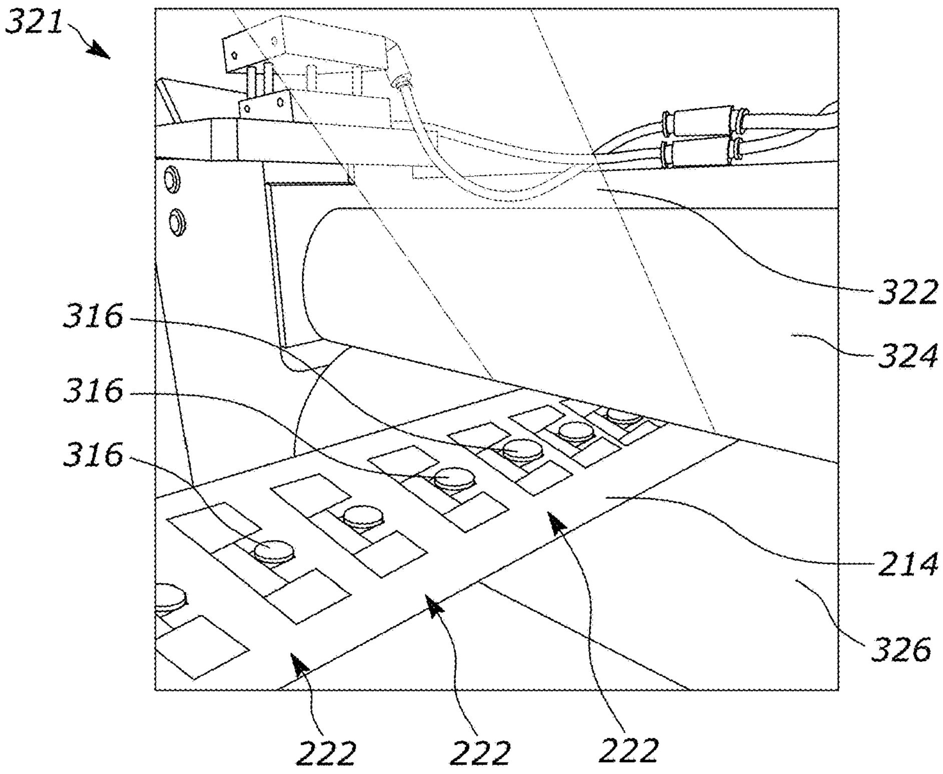
FIG. 9 illustrates an example lamination device for the system of FIG. 1, according to at least one aspect of the present disclosure.

After the wick is dispensed, the media element 222 is moved from the wick dispenser 300 and position proximate a lamination device 320. FIG. 9 illustrates a lamination device 321 that can be used as the lamination device 320 for the system 200, according to at least one aspect of the present disclosure. The lamination device 321 includes a first roller 324 and a second roller 326 positioned proximate the first roller 324. In at least one aspect, the first roller 324 includes a heater that heats the first roller 324. In at least one aspect, the first roller 324 and the second roller 326 are positioned such that the first roller 324 is in contact with the second roller 326. In some aspects, the first roller 324 is pressed against the second roller 326 by a force.

The lamination device 321 applies a lamination layer 322 to the to the media elements 222 on the media web 214. Referring to FIG. 9, the media web 214 and the lamination layer 322 are fed between the first roller 324 and the second roller 326 of the lamination device 321. The lamination layer 322 is positioned to cover the wicks 316 on the media elements 222. As the media web 214 and the lamination layer 322 pass between the rollers 324 and 326, the rollers 324 and 326 compress the lamination layer 322 against the media web 214. The heat of the first roller 324 causes the lamination layer 322 to attach to the media web 214. In at least one aspect, the lamination layer 322 holds each wick 316 and powder material 274 in position on each media element 222. The media web 214 exits the lamination device 321 with the lamination layer 322 attached to the media web 214.

Figure 10:
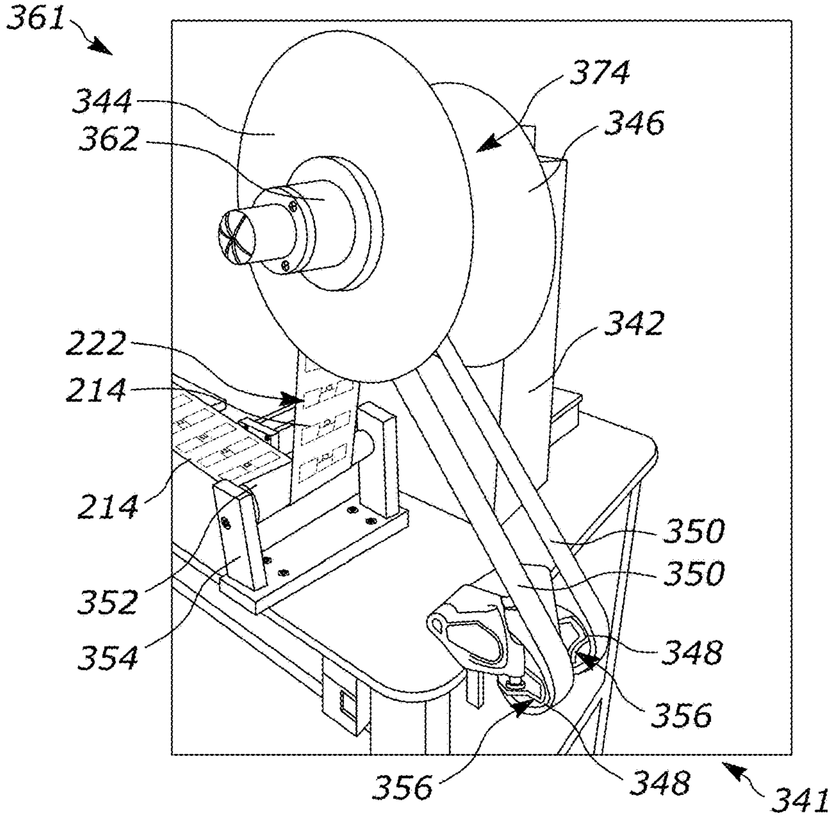
FIG. 10 illustrates an example filler material device for the system of FIG. 1, according to at least one aspect of the present disclosure.

After the lamination layer 322 is applied, the media element 222, in some aspects, is moved from the lamination device and proximate a filler material dispenser 340. FIG. 10 illustrates a filler material device 341 and a take-up device 361 that can be used as the filler material dispenser 340 and take-up device 360, respectively, for the system 200, according to at least one aspect of the present disclosure. The media web 214 extends from the lamination device and around the third roller 352 and to the take-up device 361. The media web 214 is then spooled around the take-up roller 362. The filler material device 341 is configured to apply the filler material to the media elements 222 as the media web 214 is spooled onto the take-up roller 362.

The filler material device 341 includes a roller 356, a spool 348, and filler material 350 spooled around the spool 348. Referring to FIG. 10, two separate sections of filler material 350 are added to the media web 214. In an alternative aspect, any number of sections of filler material 350 could be added to the media web 214. In FIG. 10, the filler material 350 is added to both sides of the sensor area where the powder material 274 and wick 316 is located. In at least one aspect, the filler material 350 is a paper or polymer material.

The filler material 350 can have an adhesive that allows the filler material 350 to stick to the media elements 222. The filler material 350 is placed against the media elements 222 such that the adhesive on the filler material 350 contacts the media elements 222.

The filler material 350 provides a generally uniform thickness to the media element. For example, the powder material 274 and wick 316 will add a thickness to the media element and the filler material 350 can be used to make the thickness of the media element 222 outside of the sensor area the same thickness as the sensor area. Stated another way, the filler material 350 can be used to bridge the gap between layers formed by the thickness of the environmental sensor so that a thickness of the media element is uniform.

FIG. 10 shows the filler material 350 being added to the media elements 222 on the media web 214 as the media web 214 is rolled onto the media take-up device 361. Stated another way, the filler material dispenser 340 works with the media take-up device 361 to apply the filler material 350 as the media elements 222 are collected. The take-up roller 362 can have a first guide 344 and a second guide 346 that are configured to guide the filler material 350 and the media web 214 onto the take-up roller 362. The media elements 222 with completed environmental sensors form a collection 364 on the take-up roller 362.

In an alternative aspect, the filler material 350 could be added to the media element 222 by compressing the filler material 350 against the media elements 222. For example, the filler material 350 can be compressed between two rollers to attach the filler material 350 to the media elements 222 of the media web 214.

The take-up roller 362 is attached to a housing 342. The housing 342 encloses the take-up motor that is mechanically coupled to the take-up roller 362. The take-up motor in the housing 342 controls the rotation of the take-up roller 362.

In some aspects, filler material 350 is not added to the media element. FIG. 11 illustrates the take-up device 361 gather the media elements 222 on the take-up roller 362 without the first guide 344, the second guide 346, or the filler material device 341, according to at least one aspect of the present disclosure.

While FIGS. 4-11 illustrate one method of moving the media elements through the system 200, the reader will readily appreciate that there are other similar methods. For example, the media supply could be in the form of a stacked media web and the media elements 222 could be pulled from a supply stack and the completed media element could be gathered in a take-up stack. Another example, is instead of a media element 222 being moved into position with the devices 240, 252, 260, 272, 280, 300, 320, and 340 of the system 200, the devices 240, 252, 260, 272, 280, 300, 320, and 340 of the system 200 could be moved into position over a media element 222. For example, one media element at a time could be pulled from the media supply and placed in a first position and the devices 240, 252, 260, 272, 280, 300, 320, and 340 could be moved to the first position sequentially to complete an environmental sensor. The media element 222 could then be moved and placed in a completed collection. As yet another example, the media elements 222 could be separated and not on a web (e.g. in an individual stack) and each media element 222 could be moved through the system 200 on a conveyor structure or have the devices 240, 252, 260, 272, 280, 300, 320, and 340 moved to the media element 222 to complete the environmental sensor. As such, there are many examples of how the media elements 222 could be supplied, positioned relative to the devices 240, 252, 260, 272, 280, 300, 320, and 340, and collected. The method of moving, positioning, and collecting the media elements 222 shown in FIGS. 4-11 is only one such non-limiting example for the sake of brevity.

Figure 12:
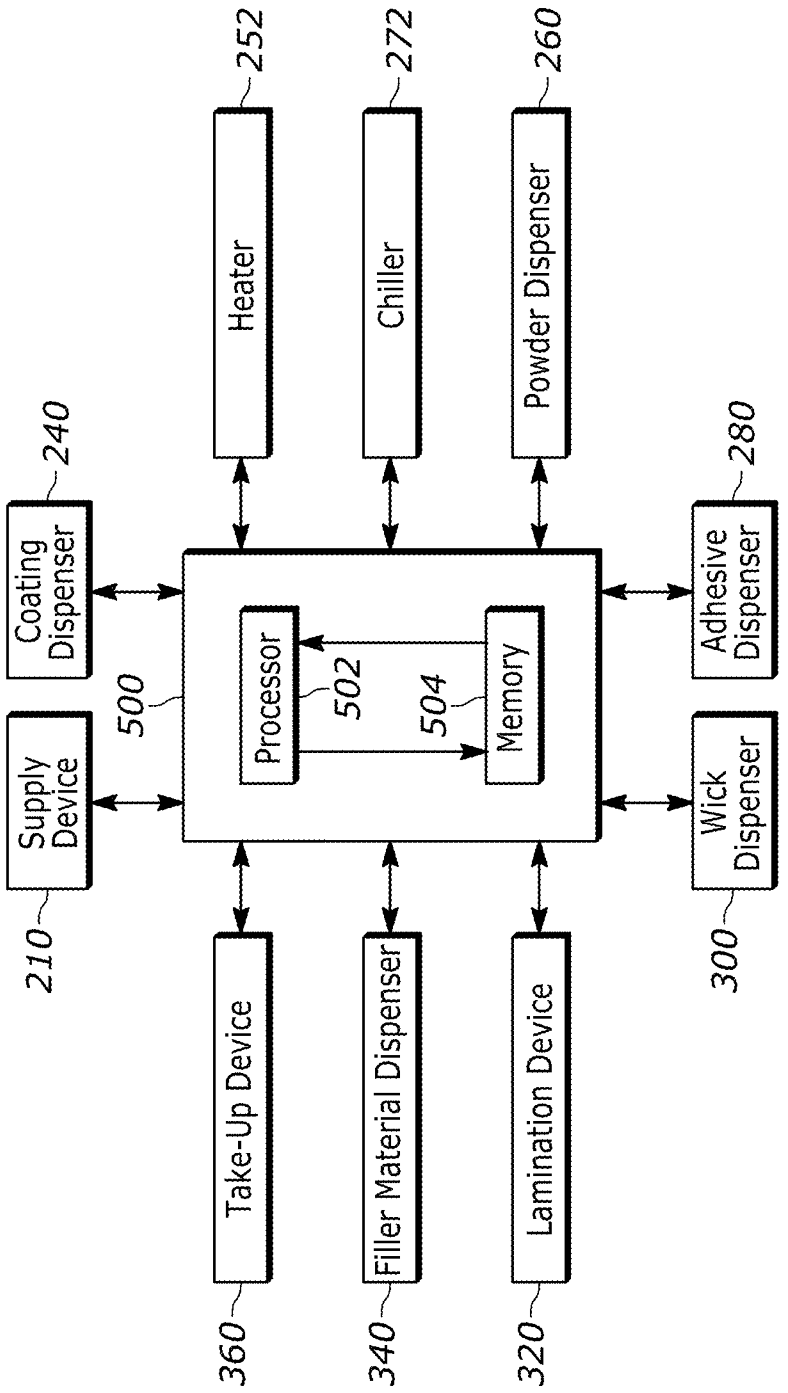
FIG. 12 illustrates an example control system diagram of the system of FIG. 1, according to at least one aspect of the present disclosure.

FIG. 12 illustrates an example control system diagram of the system 200, according to at least one aspect of the present disclosure. The system 200 can be automated through the use of a control circuit 500. The control circuit 500 includes a processor 502 and a memory 504. The control circuit 500 transmits signals to and receives signals from the different devices 210, 240, 252, 260, 272, 280, 300, 320, 340, and 360 to control the system 200.

The control circuit 500 is communicably coupled to the supply device 210 and can transmit signals to and receive signals from the supply device 210 to control the movement of the media web 214. For example, regarding supply device 211, the control circuit 500 can control the supply motor of supply device 211. The control circuit 500 is communicably coupled to the coating dispenser 240 and can transmit signals to and receive signals from the coating dispenser 240 to control the timing, location, and amount of coating dispensed. The control circuit 500 is communicably coupled to the heater 252 and can transmit signals to and receive signals from the heater 252 to control the temperature of the media element 222 positioned proximate the heater 252. The control circuit 500 is communicably coupled to the chiller 272 and can transmit signals to and receive signals from the chiller 272 to control the temperature of the media element 222 positioned proximate the chiller 272. The control circuit 500 is communicably coupled to the powder dispenser 260 and can transmit signals to and receive signals from the powder dispenser 260 to control the timing, location, and amount of powder dispensed. The control circuit 500 is communicably coupled to the adhesive dispenser 280 and can transmit signals to and receive signals from the adhesive dispenser 280 to control the timing, location, and amount of adhesive dispensed. The control circuit 500 is communicably coupled to the wick dispenser 300 and can transmit signals to and receive signals from the wick dispenser 300 to control the timing and location of a wick dispensed. The control circuit 500 is communicably coupled to the lamination device 320 and can transmit signals to and receive signals from the lamination device 320 to control the lamination device 320. In some aspects, the filler material dispenser 340 can be controlled by the control circuit 500. In some alternative aspects, the filler material dispenser 340 is controlled passively by the other devices of the system 200 (e.g. take-up device 360). The control circuit 500 is communicably coupled to the take-up device 360 and can transmit signals to and receive signals from the take-up device 360 to control the movement of the media web 214. For example, regarding take-up device 361, the control circuit could control the take-up motor of take-up device 361.

The control circuit 500 can control the different devices 210, 240, 252, 260, 272, 280, 300, 320, 340, and 360 of the system 200. This allows the control circuit 500 to move each media element 222 into position with each device 240, 252, 260, 272, 280, 300, 320, 340. This process allows the control circuit 500 to allow multiple devices 240, 252, 260, 272, 280, 300, 320, 340 to perform operations to media elements 222 at the same time. For example, a first media element 222 can be positioned proximate the coating dispenser 240 and a second media element 222 can be positioned proximate the powder dispenser 260 at the same time. The control circuit 500 can control the different devices 240, 252, 260, 272, 280, 300, 320, 340 to allow the devices 240, 252, 260, 272, 280, 300, 320, 340 to perform the appropriate operation to each media element as the media elements move through the system 200.

Figure 13:
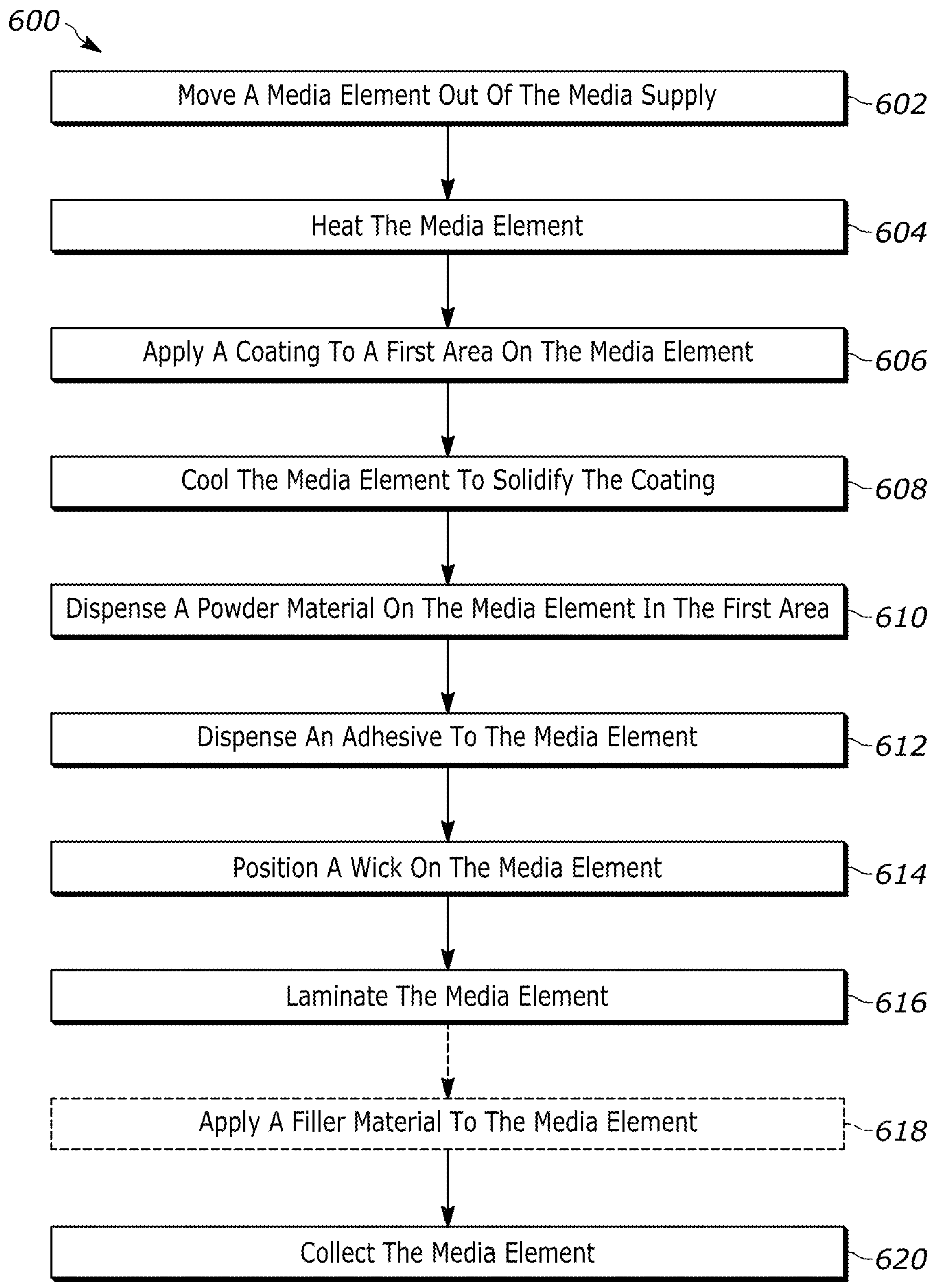
FIG. 13 illustrates an example method that can be executed by a control circuit of the system of FIG. 1, according to at least one aspect of the present disclosure.

FIG. 13 illustrates an example method 600 that can be executed by a control circuit (e.g. control circuit 500) of the system 200, according to at least one aspect of the present disclosure. The method 600 includes the control circuit moving 602 a media element (e.g. media element 222) out of the media supply, for example by the media supply device 210. The method 600 further includes the control circuit heating 604 the media element, for example by the heater 252. The method 600 further includes the control circuit applying 606 a coating to a first area on the media element, for example by the coating dispenser 240. The method 600 further includes the control circuit cooling 608 the media element to solidify the coating, for example by the chiller 272. In an alternative aspect, the control circuit could cool the media element by waiting for the ambient room temperature to cool the media element and solidify the coating. The method 600 further includes the control circuit dispensing 610 a powder material on the media element in the first area, for example by the powder dispenser 260. The method 600 further includes the control circuit dispensing 612 an adhesive to the media element, for example by the adhesive dispenser 280. The method 600 further includes the control circuit positioning 614 a wick on the media element, for example by the wick dispenser 300. The method 600 further includes the control circuit laminating 616 the media element, for example by the lamination device 320. The method 600 further includes (optionally) the control circuit applying 618 a filler material to the media element, for example by the filler material device. The method 600 further includes the control circuit collecting 620 the media element, for example by the take-up device 360.

In at least one aspect, the method 600 further includes the control circuit positioning the media element proximate each device 240, 252, 260, 272, 280, 300, 320, and 340. For example, the a media web including the plurality of media elements can span from the media supply device 210 to the take-up device 360 and the control circuit can control the movement of the media elements out of the media supply device 210 and into the take-up device 360. As the media element moves from the media supply device 210 to the take-up device 360, the media elements can be positioned proximate each device 240, 252, 260, 272, 280, 300, 320, and 340. As another example, the media elements can be positioned on a conveyor and moved by the control circuit into position proximate the each device 240, 252, 260, 272, 280, 300, 320, and 340. In yet another example, a robotic arm and/or grasper can be controlled by the control circuit to move the media elements proximate each device 240, 252, 260, 272, 280, 300, 320, and 340. In an alternative aspect, the method 600 further includes positioning each device 240, 252, 260, 272, 280, 300, 320, and 340 proximate a media element. For example, each device can be attached to a robotic arm and the robotic arms can be moved by the control circuit to position each device 240, 252, 260, 272, 280, 300, 320, and 340 proximate a media element.

The order of operations and/or materials used in the system 200 can be changed to create an activatable environmental sensor. Some examples of systems that can create an activatable environmental sensor are described in FIGS. 17, 20, and 23. An activatable environmental sensor starts in a non-activated configuration and after an activation process the activatable sensor transitions to an activated configuration. In the non-activated configuration, the environmental sensor is in an initial sensor state and does not respond to a predetermined environmental condition. In at least one aspect, the activation process is applying a force greater than a predetermined force threshold to the environmental condition. In an alternative aspect, the activation process is applying a temperature greater than a predetermined temperature threshold to the environmental condition. In yet another alternative aspect, the activation process is applying a temperature greater than a predetermined temperature threshold and a force greater than a predetermined force threshold to the environmental condition. In the activated configuration, the environmental sensor is still in the initial sensor state and after exposure to a predetermined environmental condition the environmental sensor goes to a second sensor state producing an observable effect. The activatable environmental sensor in the activated configuration is substantially similar to the non-activatable sensor. As such, the materials used in the environmental sensor relate to the type of environmental sensor.

Microcapsules 154 encapsulating an indicator material 158 can be placed on a media element to form an activatable environmental sensor. The microcapsules 154 encapsulating an indicator material 158 can be placed with a powder dispenser (e.g. powder dispenser 260). The activatable environmental sensor can be activated with physical forces such as pressure, sheer, cutting or friction sufficient to rupture the encapsulation and release the indicator material 158. The forces can be applied with a device, e.g. a media processing device, by a user pinching environmental sensor by hand, or any other means to apply a force to the media element. In some aspects, heat is also applied to the environmental sensor for activation. In at least one aspect, the media can include a bursting additive (e.g. roughness and/or abrasiveness) to increase the ease of rupturing the indicator materials' encapsulation and activate the environmental sensor.

After the environmental indicator material 158 is exposed to a predetermined environmental condition, the environmental indicator material 158 can change from an initial material state to a second material state producing an observable effect. In at least one aspect, the change in material state from an initial material state to a second material state is a change in a property of the material, e.g. a state of matter, electrical conductivity, a color attributes, etc.

In at least one aspect, the microcapsules 154 prevent the observable effect from occurring in the environmental sensor by protecting the environmental indicator material 158 from exposure to the predetermined environmental condition. For example, the environmental indicator material 158 can stay in the initial material state even if the microcapsules 154 are exposed to the predetermined environmental condition. However, after the microcapsules 154 are ruptured, the environmental indicator material 158 is released and any change in the material state of the environmental indicator material 158 upon exposure to the predetermined environmental condition can cause the observable effect to be produced by the environmental sensor. In an additional or alternative aspect, the microcapsules 154 prevent the observable effect from occurring in response to the predetermined environmental condition by containing the environmental indicator material 158 when it changes material state. For example, the environmental indicator material 158 can change material states within the microcapsule 154 but the observable effect can be prevented until the microcapsules 154 are ruptured releasing the environmental indicator material 158 and the released environmental indicator material 158 is exposed to the predetermined environmental condition (e.g., by preventing movement of the material when it liquefies, or by hiding a color change of the material).

Figure 14:
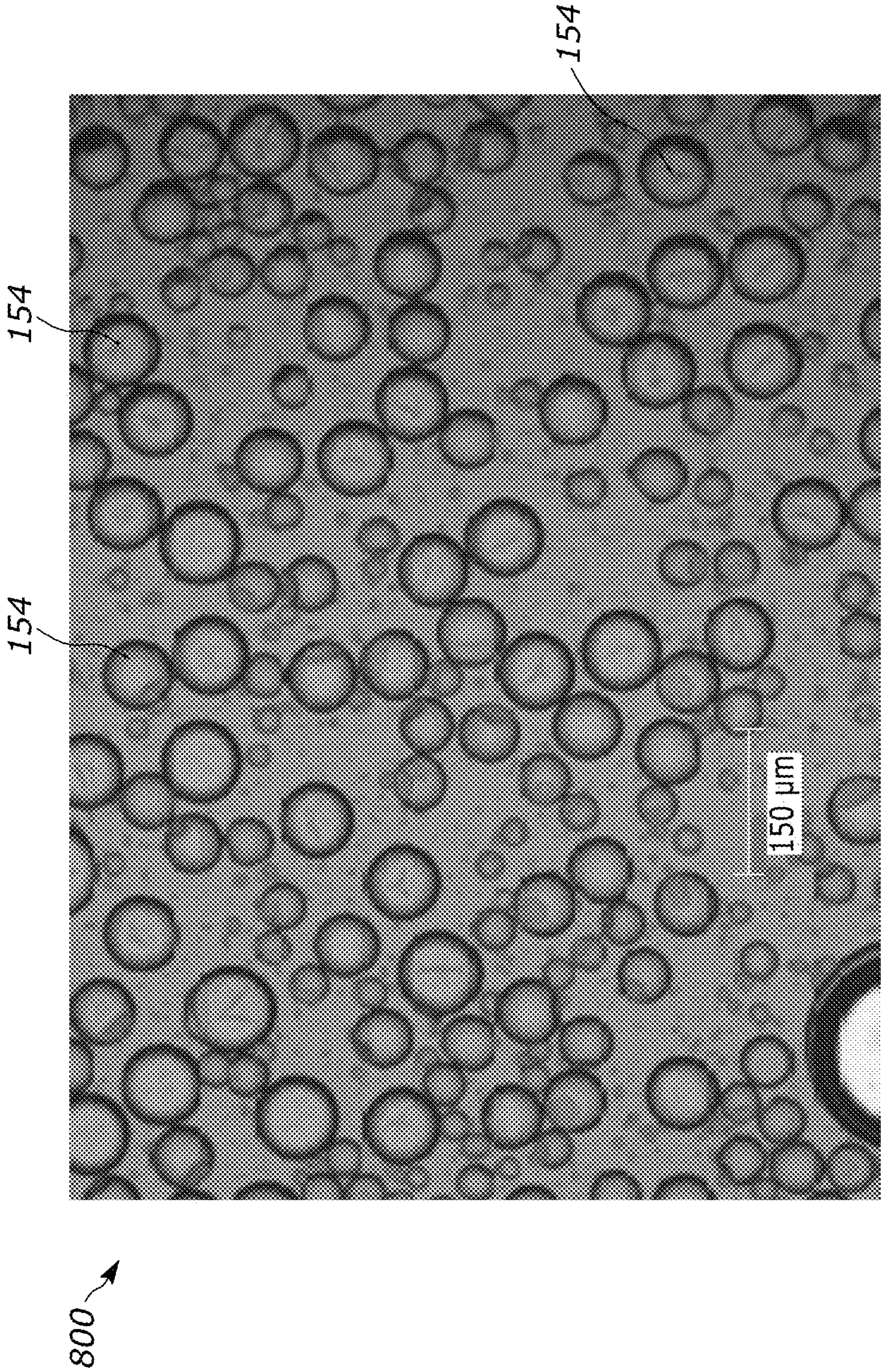
FIG. 14 illustrates an example view of a plurality of microcapsules of an environmental sensor on a media element, according to at least one aspect of the present disclosure.

In at least one aspect, a diameter of each microcapsule 154 is between 20 μm to 250 μm. The shell thickness of each microcapsule 154 can range between 5 μm to 25 μm. FIG. 14 illustrates an example view 800 of a microcapsules 154 of the environmental sensor on the media element, according to at least one aspect of the present disclosure. The microcapsules 154 can be made of a variety of materials, e.g. urea formaldehyde, gelatin, protein, melamine, polyurea formaldehyde, gel, polymelamine formaldehyde, wax material, emulsions, etc. For example, polymelamine and polyurea formaldehyde are both used for encapsulations by interfavial polymerization which uses two immiscible phases. Once separated in the same vessel, a reaction is initiated at the interface of the two immiscible phases in the presence of an initiator and the material to be encapsulated. As polymerization occurs, microcapsules 154 form around the core material. The microcapsules 154 release the environmental indicator material 158 upon rupturing the microcapsules 154.

Figure 15:
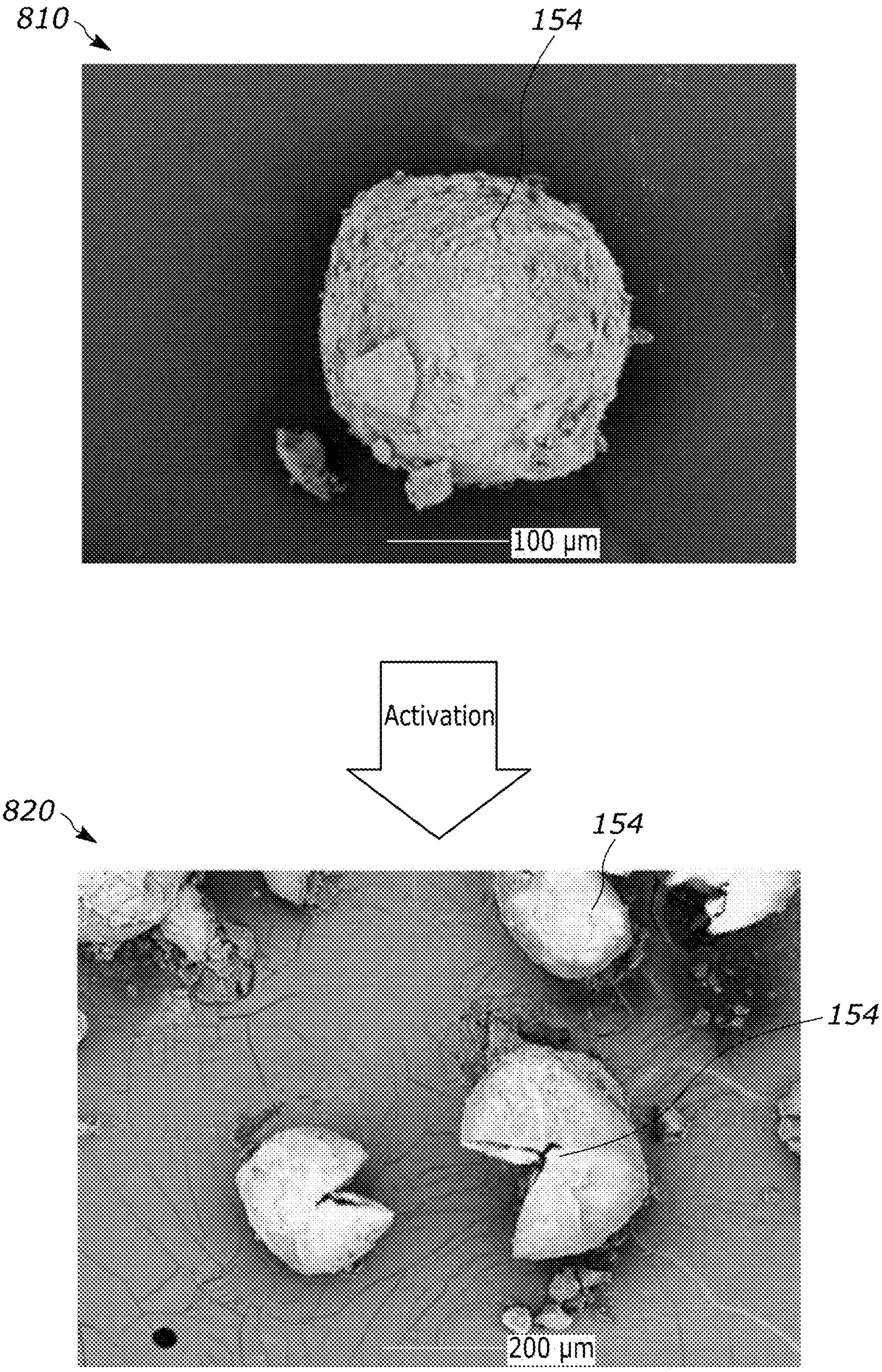
FIG. 15 illustrates a microcapsule rupturing after an activation process, according to at least one aspect of the present disclosure.

FIG. 15 illustrates a microcapsule rupturing after an activation process, according to at least one aspect of the present disclosure. The view 810 illustrates a microcapsule 154 before activation and view 820 illustrates a ruptured microcapsule after activation that released the environmental indicator material 158.

In at least one aspect, at least a portion of the microcapsules 154 are ruptured based on a force applied to the microcapsules 154, where the force exceeds or equals a predetermined threshold. The value of the predetermined threshold is based on the microcapsule material, thickness of the microcapsules 154, and/or the diameter of the microcapsules 154. The force can be a pressure force, a shear force, a frictional force, and/or a cutting force that cause at least a portion of the microcapsules 154 to rupture. In at least one aspect, the force is a pressure force and the predetermined threshold is between 1.5 pounds per square inch and 8 pounds per square inch. In an alternative aspect, the force is a pressure force and the predetermined threshold is between 4 pounds per square inch and 15 pounds per square inch. In yet another alternative aspect, the force is a pressure force and the predetermined threshold is between 16 pounds per square inch and 21 pounds per square inch.

In at least one aspect, the portion of the microcapsules 154 are ruptured based, in part, on a temperature of the microcapsules 154, where the temperature of the microcapsules 154 exceeds or is equal to a predetermined temperature threshold. For example, temperature increases can cause the microcapsules 154 to rupture based on a minor amount of force being applied to the microcapsules 154. The value of the predetermined temperature threshold is based on the microcapsule material, the thickness of microcapsules 154, and/or the diameter of the microcapsules 154. In at least one aspect, the predetermined temperature threshold is between 90° C. and 110° C. In an alternative aspect, the predetermined temperature threshold is between 90° C. and 250° C. In yet another alternative aspect, the predetermined temperature threshold is between −25° C. and 70° C. In yet another alternative aspect, the predetermined temperature threshold is between 5° C. and 70° C. As discussed above, the predetermined temperature threshold is based on the type of environmental sensor indicator.

In at least one aspect, at least a portion of the microcapsules 154 are ruptured based on both a force applied to the microcapsules 154 and a temperature of the microcapsules 154, where the force exceeds or equals a predetermined threshold and the temperature of the microcapsules 154 exceeds or is equal to a predetermined temperature threshold. The force can be a pressure force, a shear force, a frictional force, or a cutting force that cause at least a portion of the microcapsules 154 to rupture. In at least one aspect, the predetermined temperature threshold is between 90° C. and 110° C., the force is a pressure force, and the predetermined threshold is between 4 pounds per square inch and 15 pounds per square inch. In an alternative aspect, the predetermined threshold is between 1.5 pounds per square inch and 8 pounds per square inch.

In at least one aspect, each microcapsule 154 of the microcapsules 154 can have a first shell wall and a second shell wall encapsulating the environmental indicator material 158. For example, the first shell wall surrounds the environmental indicator material 158 and the second shell wall surrounds the first shell wall. Stated another way, there are two coating to each microcapsule 154 that surround the environmental indicator material 158. The first shell wall is configured to rupture based, in part, on a temperature being equal to or greater than a predetermined temperature threshold. The second shell wall is configured to rupture based on a force equal to or greater than a predetermined threshold being applied to the microcapsules 154. As discussed above, the force can be a pressure force, a shear force, a frictional force, or a cutting force that causes at least a portion of the microcapsules 154 to rupture. In this aspect, both heat and a force would need to be applied to the microcapsules 154 for at least a portion of microcapsules 154 to rupture.

The microcapsules 154 are configured to rupture in response to heat and/or force, and contain environmental indicator materials 158, e.g., the microcapsules 154 described in the commonly owned applications: U.S. patent application, titled "PRINTER ACTIVATABLE ENVIRONMENTAL SENSING THROUGH CHEMICAL ENCAPSULATION", application Ser. No. 18/369,498 filed Sep. 18, 2023; U.S. patent application, titled "MEDIA PROCESSING DEVICE AND COMPONENTS FOR ACTIVATABLE MEDIA PLATFORMS", application Ser. No. 18/369,520, filed Sep. 18, 2023; U.S. patent application, titled "USE OF ENCAPSULATED POLAR PROTIC CHEMISTRIES FOR RFID TEMPERATURE MONITORING", application Ser. No. 18/369,506, filed Sep. 18, 2023; U.S. patent application, titled "MEDIA CONSTRUCTION TO FACILITATE USE OF ACTIVATABLE PLATFORM", application Ser. No. 18/369,536, filed Sep. 18, 2023; and U.S. patent application, titled "RIBBON FOR USE IN PRODUCING PRINTER ACTIVATABLE INDICATORS", application Ser. No. 18/369,548, filed Sep. 18, 2023.

Figure 16:
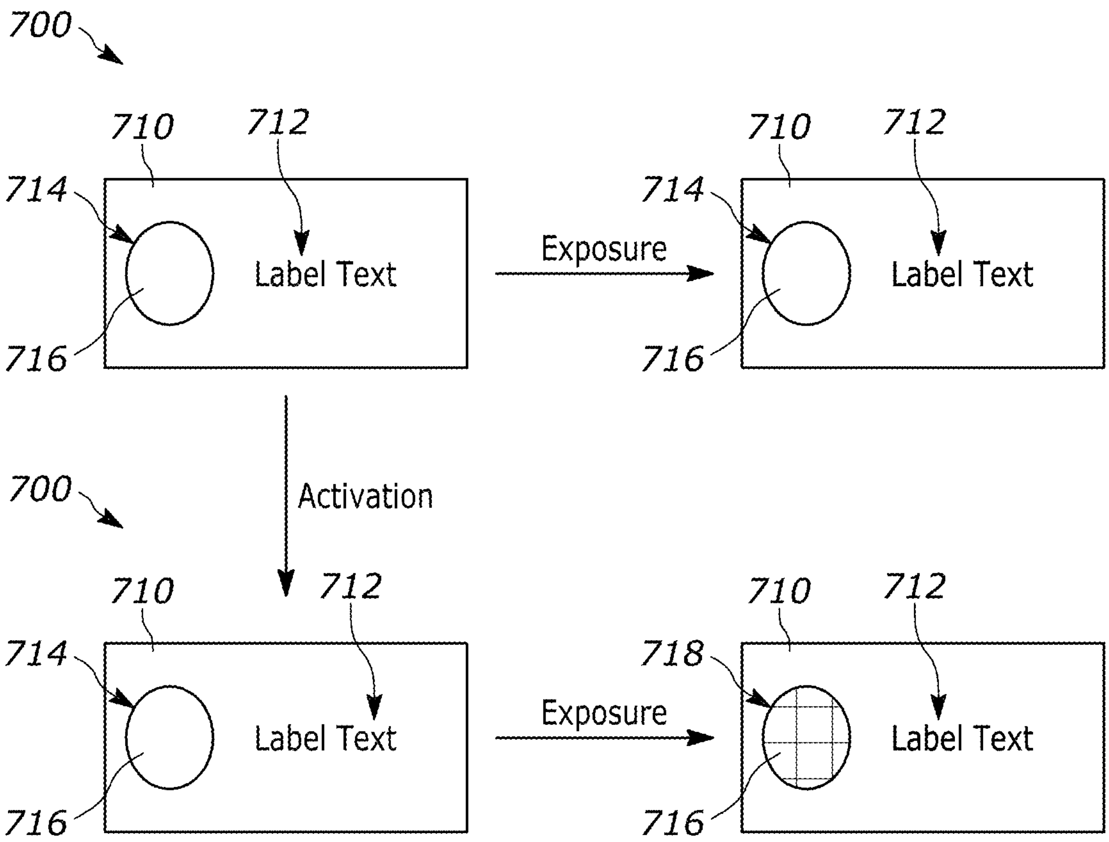
FIG. 16 illustrates a diagram showing a media element exposed to the predetermined environmental condition before and after activation, according to at least one aspect of the present disclosure.

FIG. 16 illustrates a diagram 700 showing a media element 710 exposed to the predetermined environmental condition before and after activation, according to at least one aspect of the present disclosure. The media element 710 includes label text 712 and an environmental sensor 716. The environmental sensor 716 begins in a non-activated configuration, where the environmental sensor 716 is in an initial sensor state 714 before activation and exposure. After an activation process, the environmental sensor 716 is placed in the activated configuration, where the environmental indicator material 158 in the environmental sensor 716 has been released from at least a portion of the microcapsules 154. When the released environmental indicator material 158 is exposed to the predetermined environmental condition, then the environmental sensor 716 transitions from the initial sensor state 714 to a second sensor state 718. In at least one aspect, before activation, the environmental sensor 716 does not change sensor states even when exposed to the predetermined environmental condition.

The environmental indicator material 158 encapsulated in the microcapsules 154 can be different based on the desired environmental sensor 716. The environmental indicator material 158 can be a polymer, a polymer having side-chain crystallinity, an alkane wax, a polar protic material, a wax with a colorant, a gel with a colorant, an acid, a base, etc., or a combination thereof. Some example polar protic materials are polyethylene glycol, decanol, undecanol, dodecanol, and tridecanol. The type of environmental indicator material 158 used relates to the type of environmental sensor 716. Which allows the environmental indicator material 158 to be responsive to the appropriate predetermined environmental condition for the type of environmental sensor 716 desired. Some example predetermined environmental conditions are as follows: a temperature excursion above a predetermined temperature threshold for at least a predetermined amount of time, a temperature excursion below a predetermined temperature for at least a predetermined amount of time, a cumulative exposure to temperature over a time period above a predetermined threshold for at least a predetermined amount of time, an exposure to a particular chemical, an oxygen exposure, an ammonia exposure, an exposure to a particular chemical above a threshold concentration, an exposure to a particular chemical above the threshold concentration for at least a predetermined amount of time, an exposure to at least a predetermined amount of radiation of a particular type, an ultraviolet light exposure, a humidity exposure, an exposure to a humidity level above a predetermined threshold, an exposure to a humidity level above a predetermined threshold for at least a predetermined amount of time, and etc.

Once the environmental indicator material 158 is released from at least a portion of the microcapsules 154 (i.e. after an activation process ruptures the microcapsules 154) and exposed to the predetermined environmental condition, then the released environmental indicator material 158 changes from an initial material state (e.g. corresponding to the initial sensor state 714) to a second material state (e.g. corresponding to the second sensor state 718) producing an observable effect. The observable effect can be one of a color state change, a change in transparency, a change in hue, a change in an electrical property, a change in conductivity, a change in capacitance, movement of the environmental indicator material 158 along a substrate, etc., or combinations thereof. In at least one aspect, the observable effect can be a continuous transition; however, once a threshold is met, the environmental sensor 716 would be considered to go from the initial sensor state to the second sensor state.

The observable effect is different based on the environmental indicator material 158 and the design of the media element 710. For example, an observable effect of movement of the environmental indicator material 158 along a substrate of the media element 710 can be caused by the substrate including a wick that allows a liquid environmental indicator material 158 to move along the wick (e.g., the environmental indicator material 158 can be liquid or have increased fluidity in the second material state). As another example, a change in an electrical property can be caused by an environmental indicator material 158 that melts above a specific temperature, which then allows the material to change an electrical property of a device, for example altering a dielectric in a capacitor changing capacitance, or, with a conductive liquid, completing or breaking a circuit built into the substrate of the media element 710, which changes the electrical property.

Figure 17:
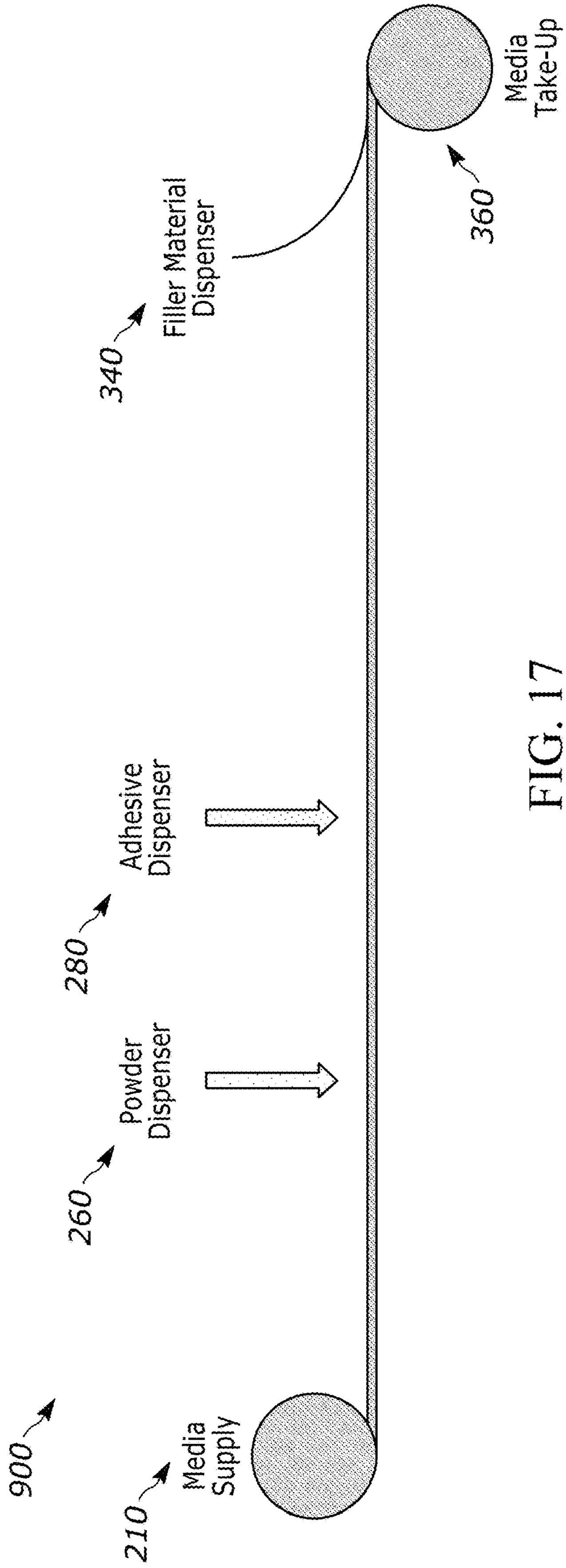
FIG. 17 illustrates a diagram of an example system to create an environmental sensor with powder dispensing, according to at least one aspect of the present disclosure.

As discussed above, the order of operations and/or materials used in the system 200 can be changed to create an activatable environmental sensor. FIG. 17 illustrates a diagram of an example system 900 to create an environmental sensor with powder dispensing, according to at least one aspect of the present disclosure. Based on the materials dispensed by the powder dispenser 260, the environmental sensor can be an activatable environmental sensor. In at least one aspect, the powder dispenser 260 dispenses microcapsules 154 as discussed in regard to FIGS. 14-16. The system 900 is substantially similar to the system 200 with some devices removed and the operations of the devices reordered. For the sake of brevity, not all the similarities between the system 900 and the system 200 will be discussed in detail.

The system 900 includes the media supply device 210, the particle dispenser 260, the filler material dispenser 340, and a media take-up device 360. The media supply device 210 includes a media supply including a plurality of media elements (e.g. media elements 100). The media supply includes a plurality of media elements. Each media element includes a media substrate. In at least one aspect, the media substrates are a paper or polymer material. The media supply can be a spool of media elements on a web, a stack of media elements on a web, a stack of individual media elements, or any other group of media elements. Media supply device 211 (FIG. 4) is one example of the media supply device 210.

The system 900 is configured to place an environmental sensor on each media element and then collect the media elements in the media take-up device 360. The system 900 is configured to create an activatable environmental sensor. Referring to FIG. 17, the media supply device 210 includes a media supply including a plurality of media elements. The system 900 positions a media element of the plurality of media elements proximate the powder dispenser 260. Powder dispenser 261 (FIG. 6) is one example of a powder dispenser 260. The powder dispenser 260 dispenses a dry powder material on the media element in a sensor area on the media element. The powder material forms at least part of the environmental sensor (e.g. environmental sensor 150, see FIG. 18). This powder material includes microcapsules 154 as discussed in regard to FIGS. 14-16.

After the dry powder material is dispensed, the system 900 positions the media element proximate the adhesive dispenser 280. In at least one aspect, the adhesive dispenser 280 dispenses an adhesive (e.g. adhesive 122, see FIG. 18) to the sensor area on top of the powder material. In at least one aspect, between 1 mg and 3 mg of an adhesive is dispensed. Some example adhesives include polyvinyl acetate, polyvinyl alcohol, and any other similar adhesive. In at least one aspect, the adhesive dispenser 280 is a liquid dispenser. In at least one aspect, the adhesive is dispensed hot at a temperature between 30° C. and 100° C. In an alternative aspect, the adhesive is dispensed at room temperature. Adhesive dispenser 281 (FIG. 7) is one example of an adhesive dispenser 280.

In an alternative aspect, the adhesive dispenser 280 is configured to place a substrate that includes an adhesive side in the sensor area where the adhesive side is positioned towards the powder material. In at least one aspect, the substrate with the adhesive holds the powder material in position. A pick-n-place device similar to the wick dispenser 301 (FIG. 8) is one example of a dispenser that could dispense a substrate that includes an adhesive side.

After the dry powder material is dispensed, the system 900 can position the media element proximate the filler material dispenser 340 for a filler material (e.g. filler material 156, see FIG. 18) to be dispensed onto the medial element when desired. When a filler material is applied to the media element, the filler material can cover an area outside of the sensor area and provides a generally uniform thickness to the media element. For example, the powder material will have a thickness on the media element and the filler material can be used to make the thickness of the media element outside of the sensor area the same thickness as the sensor area. Stated another way, the filler material can be used to bridge the gap between layers formed by the thickness of the environmental sensor so that a thickness of the media element is uniform. In at least one aspect, the filler material is a paper or polymer material. In some aspects, the paper or polymer material can have an adhesive that allows the filler material to stick to the media element. In at least one aspect, the size and type of filler material is based on the type of environmental sensor attached to the media element. Filler material device 341 (FIG. 10) is one example of a filler material dispenser 340.

In at least one aspect, the system 900 can further include a lamination device 320 similar to the system 200. Before or after the filler material is applied, the media element can be laminated (if desired) by the lamination device 320 (e.g. lamination device 321, see FIG. 9). The lamination device 320 adds a lamination layer to the media element. The lamination layer is a laminate and can be made of a plastic material. In at least one aspect, the lamination layer covers the sensor area. In at least one aspect, the lamination layer helps holds the environmental sensor in position. The lamination layer can cover the entire surface of the media element or only an area within the surface of the media element.

Figure 18:
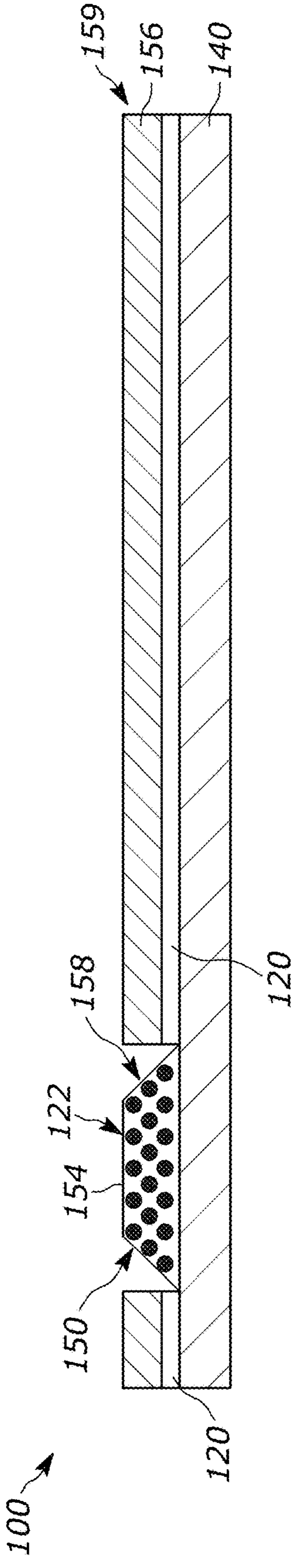
FIG. 18 illustrates a diagram of a cross-section of an example media element including an environmental sensor, according to at least one aspect of the present disclosure.

FIG. 18 illustrates a diagram of a cross-section of an example media element 100 including an environmental sensor 150, according to at least one aspect of the present disclosure. Media element 100 is one non-limiting example of a media element. The media element 100 is an activatable media element and as such the media element 100 functions substantially similar to media element 710. Some examples of media elements 100 that can include the encapsulated indicator material 158 can include, for example, labels, tags, wristbands, inlays, plastic cards, etc. For example, the microcapsules 154 can be placed on a media substrate 140 of the media element 100 by the powder dispenser 261. The media element 100 is made of layers attached to each other with adhesive (e.g. adhesive 120). In at least one aspect, one of the layers is a paper or polymer material (e.g. media substrate 140). One of the layers is the environmental sensor layer 159 that includes microcapsules 154 encapsulating an indicator material 158 to form the environmental sensor 150 on the media element 100.

In some aspects, the environmental sensor layer 159 further includes a filler material 156 (e.g., to provide a generally uniform thickness of the media element 100). In some aspects, the filler material 156 can be part of the environmental sensor 150 (e.g. a wicking material to move the indicator material 158 along the media substrate 140). In an additional/alternative aspect, the filler material 156 is used to bridge the gap between layers formed by the thickness of the microcapsules 154 (e.g. the filler material can be face sheet material and/or paper or polymer material) so that a thickness of the media element 100 is uniform. In at least one aspect, the filler material 156 is based on the type of environmental sensor 150 attached to the media element 100. The filler material 156 can include an adhesive layer 120 that allows the filler material to be attached to the media substrate 140.

In at least one aspect, the media substrate 140 material is a paper material, polyester material, thermoplastic and/or vinyl polymer materials, such as polypropylene, polyethylene, polyethylene terephthalate, nylon, and/or Tyvek®, and/or any combination thereof. Some examples of media elements 100 that can include the encapsulated indicator material 158 are labels, tags, wristbands, inlays, plastic cards, and etc.

In at least one aspect, the media element 100 includes a layer that is a face sheet covering the layer 159 with the microcapsules 154. In some aspects, when the observable effect corresponds to a visual effect, the face sheet can have more or one windows or openings through which a portion of the environmental sensor 150 and/or the environmental sensor layer 159 can be viewed. In at least one aspect, the face sheet material is a paper material, polyester material, thermoplastic and/or vinyl polymer materials, such as polypropylene, polyethylene, polyethylene terephthalate, nylon, and/or Tyvek®, and/or any combination thereof. In some aspects, the media element 100 can be printed on through a thermal transfer printing process. In some aspects, the media element 100 includes a layer with a heat activated thermal coating (e.g., the face sheet can include the heat activated thermal coating), which allows the media element 100 to be printed on using a direct thermal printing process.

In at least one aspect, the a mechanism inside of a media processing device can cause at least a portion of the microcapsules 154 to rupture as the media element 100 passed through a media processing device. One example of such a mechanism is a platen roller and print head of a media processing device that supply the force and/or temperature to the media element needed to cause at least a portion of the microcapsules 154 to rupture releasing the environmental indicator material 158. Another example would be to pass the media processing device between two rollers that apply a force to the media element to cause at least a portion of the microcapsules 154 to rupture releasing the environmental indicator material 158. In at least one aspect, the activation mechanism can supply a pressure of 13 pounds per square inch with the predetermined force threshold for rupture being 8 pounds per square inch, which would cause a portion of the microcapsules 154 to rupture. In an alternative aspect, the predetermined force threshold can be 5 pounds per square inch and the activation mechanism can supply a force of 8 pounds per square inch to the media element 100 causing a portion of the microcapsules 154 to rupture. The predetermined force threshold is based on the materials and thickness of the shell of the microcapsules 154.

In an alternative aspect, the activation mechanism can be a user's hand and the user can apply a force to the media element 100 with the user's fingers making the fingers be the activation mechanism. In this aspect, the predetermined force threshold for rupture can be 20 pounds per square inch and the user's hand can supply a pressure greater than 20 pounds per square inch causing at least a portion of the microcapsules 154 to rupture. The predetermined force threshold is based on the materials and thickness of the shell of the microcapsules 154.

The releasing of the environmental indicator material 158 transitions the environmental sensor 150 on the media element 100 from a non-activated configuration to an activated configuration. Once in the activated configuration, the environmental sensor 150 can change from an initial sensor state to a second sensor state producing an observable effect upon exposure of the environmental indicator material 158 to the predetermined environmental condition as discussed in regard to FIGS. 14-16.

Figure 19:
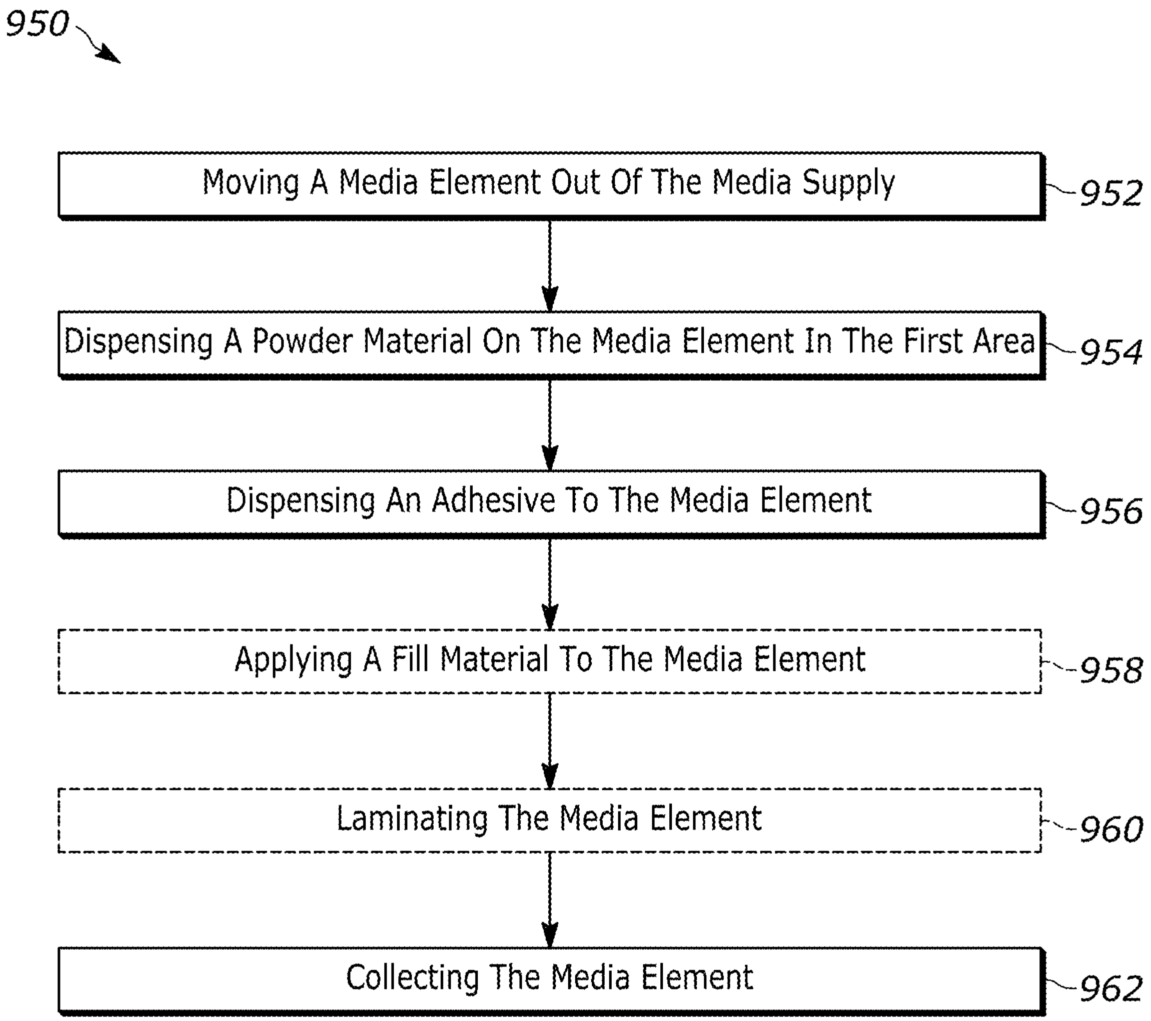
FIG. 19 illustrates an example method that can be executed by a control circuit of the system of FIG. 17, according to at least one aspect of the present disclosure.

FIG. 19 illustrates an example method 950 that can be executed by a control circuit (e.g. control circuit 500) of the system of 900, according to at least one aspect of the present disclosure. The method 950 includes the control circuit moving 952 a media element (e.g. media element 100) out of the media supply, for example by the media supply device 210. The method 950 further includes the control circuit dispensing 954 a powder material on the media element in a sensor area, for example by the powder dispenser 260. The method 950 further includes the control circuit dispensing 956 an adhesive to the media element in the sensor area, for example by the adhesive dispenser 280. The method 950 further includes (optionally) the control circuit applying 958 a filler material to the media element, for example by the filler material device. The method 950 further includes (optionally) the control circuit laminating 960 the media element, for example by the lamination device 320. The method 950 further includes the control circuit collecting 962 the media element, for example by the take-up device 360.

In at least one aspect, the method 950 further includes the control circuit positioning the media element proximate each device 260, 280, 320, and 340. For example, a media web including the plurality of media elements can span from the media supply device 210 to the take-up device 360 and the control circuit can control the movement of the media elements out of the media supply device 210 and into the take-up device 360. As the media element moves from the media supply device 210 to the take-up device 360, the media elements can be positioned proximate each device 260, 280, 320, and 340. As another example, the media elements can be positioned on a conveyor and moved by the control circuit into position proximate the each device 260, 280, 320, and 340. In yet another example, a robotic arm and/or grasper can be controlled by the control circuit to move the media elements proximate each device 260, 280, 320, and 340. In an alternative aspect, the method 950 further includes positioning each device 260, 280, 320, and 340 proximate a media element. For example, each device can be attached to a robotic arm and the robotic arms can be moved by the control circuit to position each device 260, 280, 320, and 340 proximate a media element.

Figure 20:
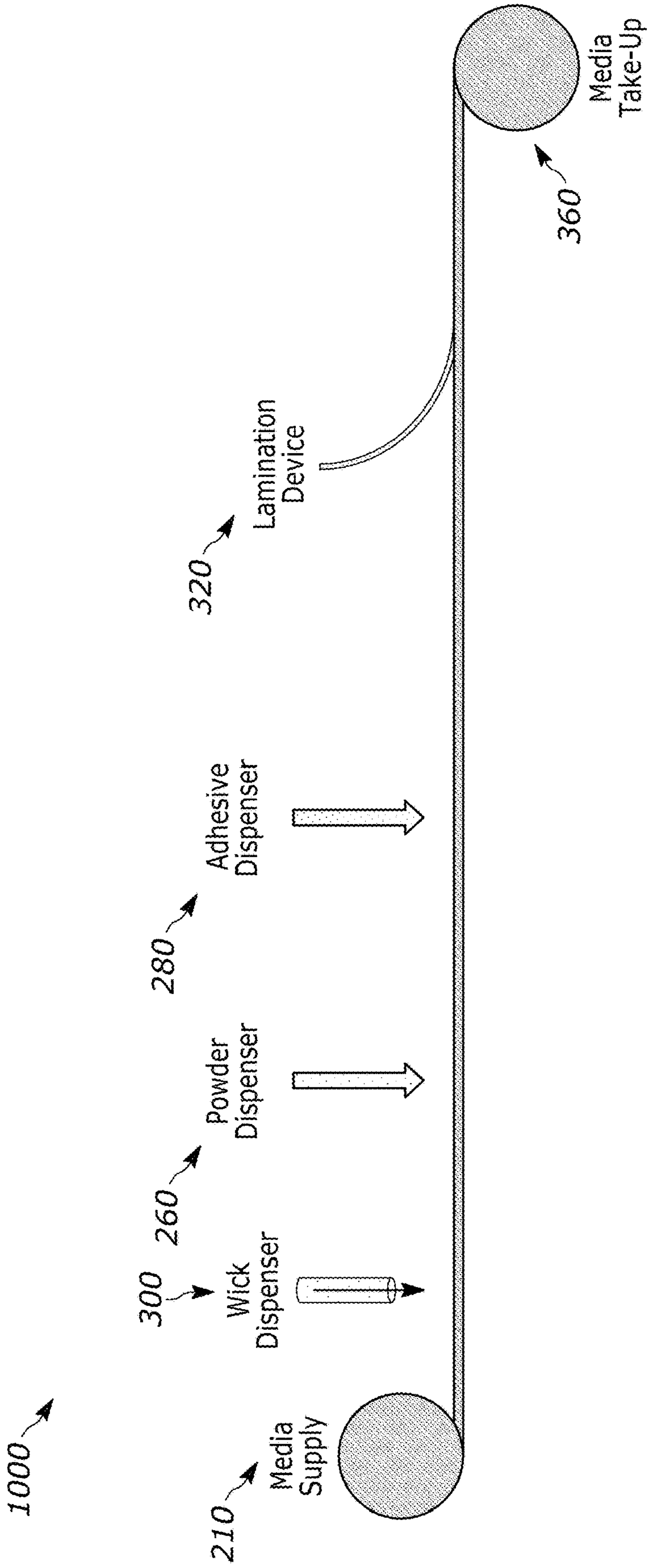
FIG. 20 illustrates a diagram of an example system to create an environmental sensor with powder dispensing, according to at least one aspect of the present disclosure.
Figure 22:
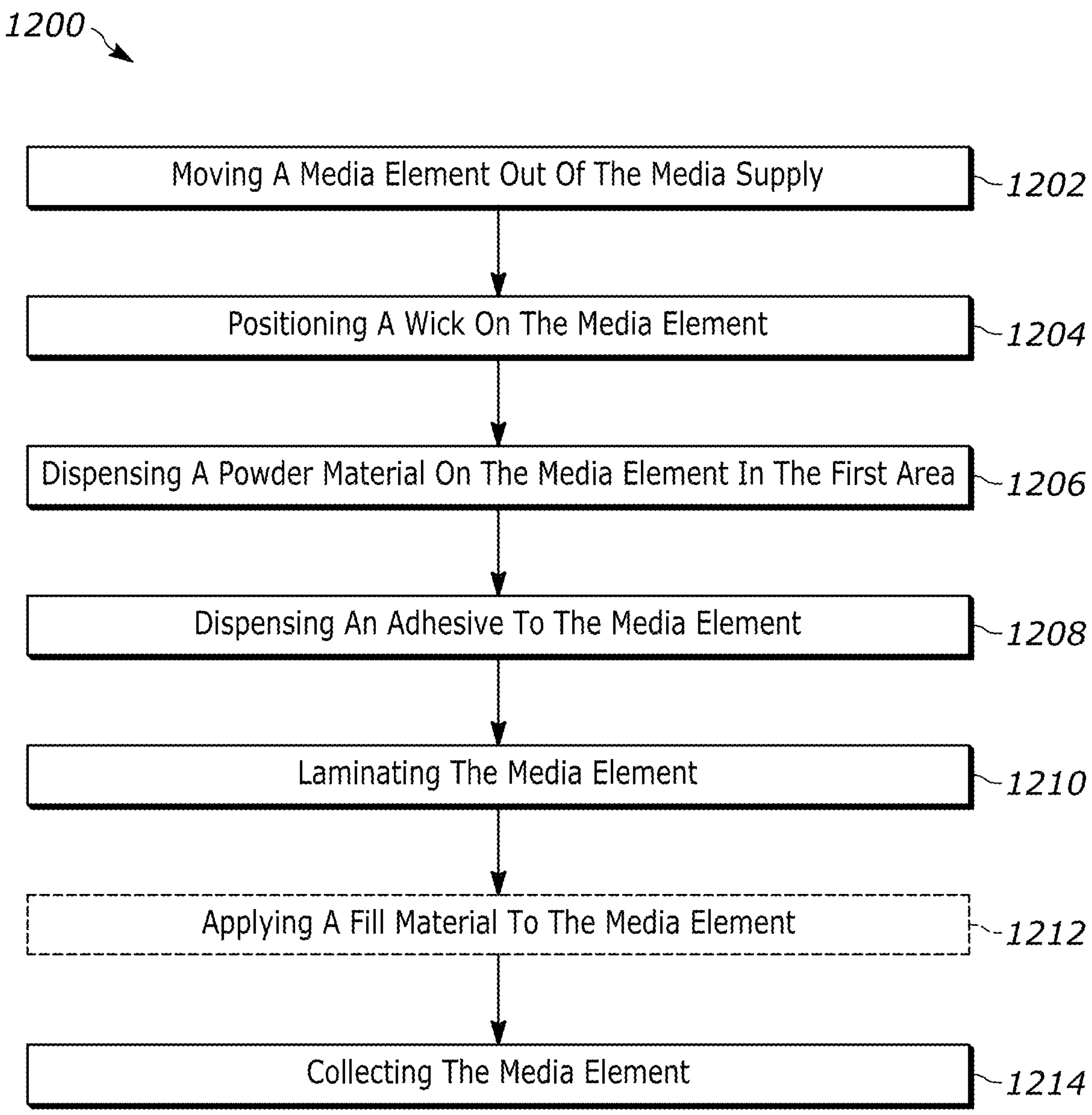
FIG. 22 illustrates a method that can be executed by a control circuit of the system of FIG. 20, according to at least one aspect of the present disclosure.
Figure 23:
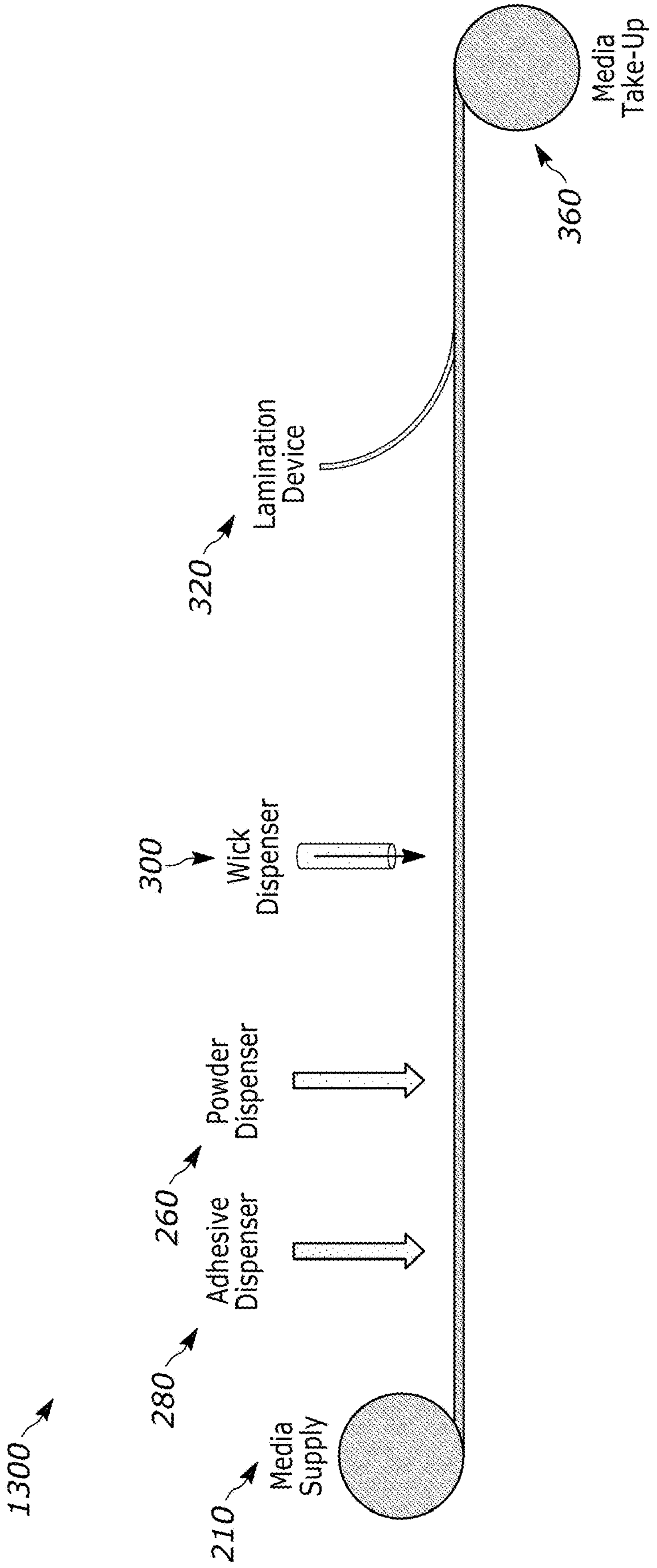
FIG. 23 illustrates a diagram of a system to create an environmental sensor with powder dispensing, according to at least one aspect of the present disclosure.

In at least one aspect, the system 900 can further include a wick dispenser 300 similar to the system 200. A wick can be positioned by the wick dispenser 300 (e.g. wick dispenser 301) anytime throughout the process of the system 900. System 1000 (FIG. 20) and system 1300 (FIG. 23) are example systems similar to the system 900 with a wick dispenser included. The order of operations and the placing of the wick can be based on the type of environmental sensor being produced. FIGS. 20-22 illustrate an example environmental sensor where the powder material is dispensed on the wick and FIGS. 23-25 illustrate an example where a wick is dispensed on the powder material. The type of wick and the type of powder material used are some of the factors that dictate the type of environmental sensor being created.

FIG. 20 illustrates a diagram of an example system 1000 to create an environmental sensor with powder dispensing, according to at least one aspect of the present disclosure. In at least one aspect, the powder dispenser 260 dispenses microcapsules 154 as discussed in regard to FIGS. 14-16. The system 1000 is substantially similar to the systems 200 and 900 with some devices removed and/or added and the operation of the devices reordered. For the sake of brevity, not all the similarities between the system 900 and the system 200 will be discussed in detail.

The system 1000 includes the media supply device 210, the particle dispenser 260, the adhesive dispenser 280, the wick dispenser 300, the lamination device 320, and a media take-up device 360. The media supply device 210 includes a media supply including a plurality of media elements (e.g. media elements 1100, see FIG. 21A). The media supply includes a plurality of media elements. Each media element includes a media substrate (e.g. media substrate 1102, see FIG. 21A). In at least one aspect, the media substrates are a paper or polymer material. The media supply can be a spool of media elements on a web, a stack of media elements on a web, a stack of individual media elements, or any other group of media elements. Media supply device 211 (FIG. 4) is one example of the media supply device 210.

The system 1000 is configured to place an environmental sensor (e.g. environmental sensor 1116) on each media element and then collect the media elements in the media take-up device 360. The system 1000 is configured to create an activatable environmental sensor. Referring to FIG. 20, the media supply device 210 includes a media supply including a plurality of media elements.

The system 1000 positions a media element of the plurality of media elements proximate a wick dispenser 300. The wick dispenser 300 is configured to pull a wick from a supply of wicks and position the wick on the media element. The wick is positioned such that the wick covers at least a portion of a first area on the media element. In at least one aspect, the first area is a sensor area. In at least one alternative aspect, the wick covers at least a portion of the first area and a portion of a second area outside of the first area. For example, the wick can connect the first area to the second area and at least a portion of an electrical component can reside in the second area and not in the first area. This would allow the wick the potential to transfer a material from the first area to the second area. As another example, the wick can connect the first area to the second area and the second area can be in an observable area on the media element while the first area is hidden. Stated another way, the finished media element can cover the first area so it is not visible and have the second area be visible. The wick can allow a material to be transferred from the first area to the second area. Wick dispenser 301 is one example of the wick dispenser 300 (See FIG. 8).

After the wick is dispensed, the system 1000 positions the media element proximate the powder dispenser 260. Powder dispenser 261 (FIG. 6) is one example of the powder dispenser 260. The powder dispenser 260 dispenses a dry powder material on the media element in a first area on the media element. In at least one aspect, the amount of the powder material dispensed is between 1 mg to 5 mg for each media element. The powder material forms at least part of the environmental sensor (e.g. environmental sensor 1116, see FIG. 21E). This powder material includes microcapsules 154 as discussed in regard to FIGS. 14-16.

After the dry powder material is dispensed, the system 1000 positions the media element proximate the adhesive dispenser 280. In at least one aspect, the adhesive dispenser 280 dispenses an adhesive (e.g. adhesive 1114, see FIG. 21D) to the first area on top of the powder material. In at least one aspect, between 1 mg and 3 mg of an adhesive is dispensed. Some example adhesives include polyvinyl acetate, polyvinyl alcohol, and any other similar adhesive. In at least one aspect, the adhesive dispenser 280 is a liquid dispenser. In at least one aspect, the adhesive is dispensed hot at a temperature between 30° C. and 100° C. In an alternative aspect, the adhesive is dispensed at room temperature. Adhesive dispenser 281 (FIG. 7) is one example of the adhesive dispenser 280.

In an alternative aspect, the adhesive dispenser 280 is configured to place a substrate that includes an adhesive side in the sensor area where the adhesive side is positioned towards the powder material. In at least one aspect, the substrate with the adhesive holds the powder material in position. A pick-n-place device similar to the wick dispenser 301 (FIG. 8) is one example of a dispenser that could dispense a substrate that includes an adhesive side.

After the adhesive is dispensed, the system 1000 can position the media element proximate the lamination device 320. The lamination device adds a lamination layer to the media element. The lamination layer is a laminate and can be made of a plastic material. In at least one aspect, the lamination layer covers the sensor area and wick. In at least one aspect, the lamination layer holds the powder material, adhesive, and wick of the environmental sensor in position. The lamination layer can cover the entire surface of the media element or only an area within the surface of the media element. Lamination device 321 (FIG. 9) is one example of the lamination device 320.

In at least one aspect, the system 1000 can further include a filler material dispenser 340 similar to the system 200. Before or after the lamination is applied, the filler material dispenser 340 can dispenser a filler material (e.g. filler material 156, see FIG. 18) onto the medial element, if desired. When a filler material is applied to the media element, the filler material can cover an area outside of the first area and second area and provides a generally uniform thickness to the media element. For example, the powder material and wick will have a thickness on the media element and the filler material can be used to make the thickness of the media element outside of the first area and second area the same thickness as the first area and/or second area. Stated another way, the filler material can be used to bridge the gap between layers formed by the thickness of the environmental sensor so that a thickness of the media element is uniform. In at least one aspect, the filler material is a paper or polymer material. In some aspects, the paper or polymer material can have an adhesive that allows the filler material to stick to the media element. In at least one aspect, the size and type of filler material is based on the type of environmental sensor attached to the media element. Filler material device 341 (FIG. 10) is one example of a filler material dispenser 340.

FIGS. 21A-F illustrates an example of creating an activatable environmental sensor 1116 with powder dispensing, activating the environmental sensor 1116, and exposing the activated environmental sensor 1116 to a predetermined environmental condition, according to at least one aspect of the present disclosure. In at least one aspect, the media element 1100 is includes a media substrate 1102. The media element 1100 has an electrical component 1104 on and/or in the media element 1100 and a portion 1120 of the electrical component 1104 is within a first area 1106 on the media element 1100. In some examples the electrical component 1104 is made with a metal (e.g., copper, aluminum, silver, gold). In at least one aspect, the electrical component is a radio frequency identification (RFID) tag or a near-field communication (NFC) tag.

Figure 21A:
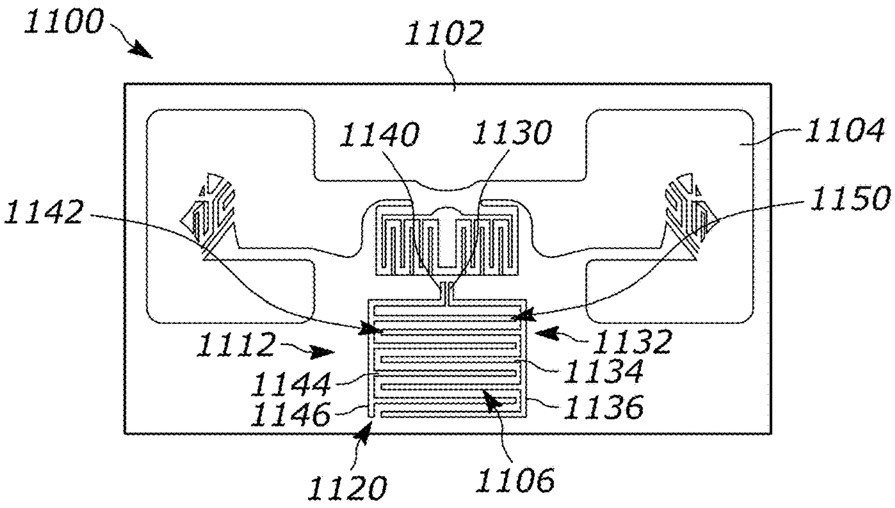
FIGS. 21A-F illustrates an example of creating an environmental sensor with powder dispensing, activating the environmental sensor, and exposing the activated environmental sensor to a predetermined environmental condition, according to at least one aspect of the present disclosure.

Referring to FIG. 21A, the portion 1120 of the electrical component 1104 can include a first electrode 1132, a second electrode 1142, and a gap 1150 between the first electrode 1132 and the second electrode 1142. In some aspects, the first electrode 1132 and the second electrode 1142 form a capacitor. The first electrode 1132 may be connected to a first contact terminal 1130 and the second electrode 1142 may be connected to a second contact terminal 1140. The first electrode 1132 and the second electrode 1142 may be in a comb shape and interleaved with each other. For example, the first electrode 1132 may include a first base plate 1136 and plurality of first sub-electrodes 1134 extending from the first base plate 1136, and the second electrode 1142 may include a second base plate 1146 and plurality of second sub-electrodes 1144 extending from the second base plate 1146. The gap 1150 may be formed between the plurality of first sub-electrodes 1134 of the first electrode 1132 and the plurality of second sub-electrodes 1144 of the second electrode 1142.

Figure 21B:
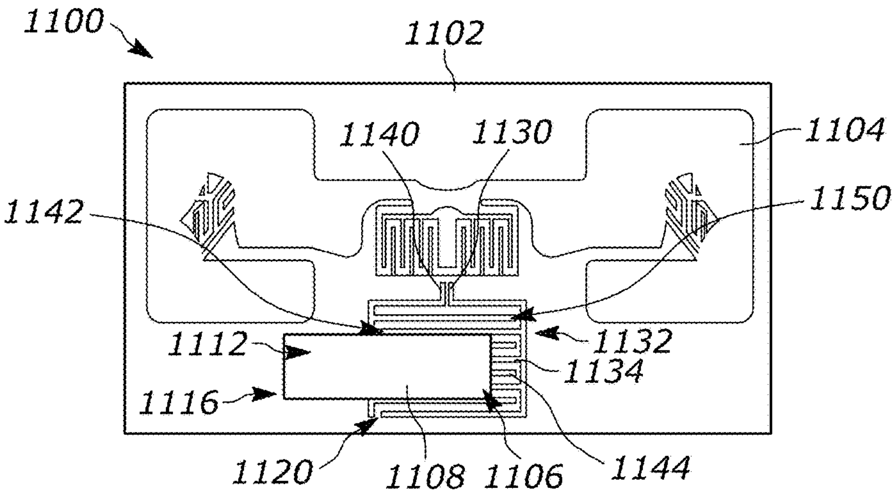

FIG. 21B illustrates a wick 1108 positioned on the media element 1100, according to at least one aspect of the present disclosure. In at least one aspect, the wick 1108 was positioned by the wick dispenser 300 as discussed in regard to FIG. 20. The wick covers at least a portion of the first area 1106 on the media element and the wick also covers at least a portion of the second area 1112 on the media element. The portion 1120 of the electrical component 1104 is within the first area 1106 on the media element 1100 and the second area 1112 is outside of the first area. As such, the second area 1112 is outside of the portion 1120 of the electrical component 1104.

Figure 21C:
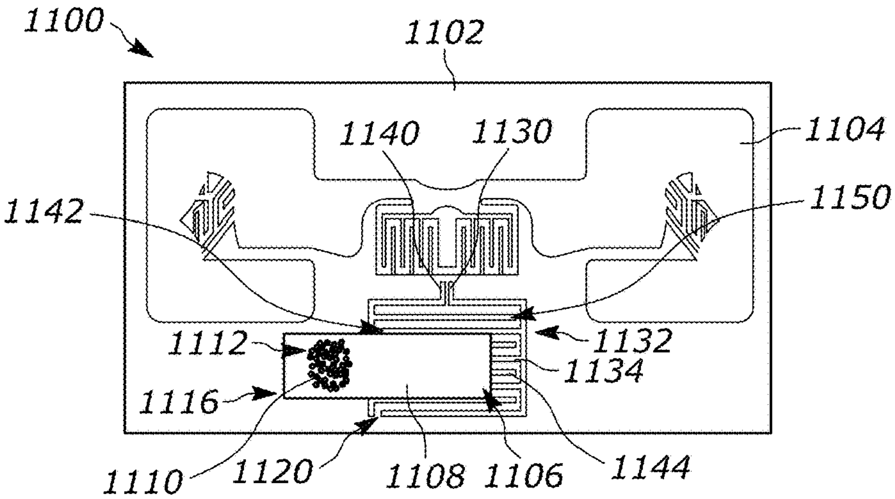

FIG. 21C illustrates a powder material 1110 dispensed in the second area 1112 on the media element 1100 on top of the wick 1108, according to at least one aspect of the present disclosure. In at least one aspect, the powder material 1110 was dispensed by the powder dispenser 260 as discussed in regard to FIG. 20. For example, between 1 mg to 5 mg of powder material is dispensed by the powder dispenser 260. The powder material includes microcapsules 154 encapsulating an environmental indicator material as discussed in regard to FIGS. 14-16. The second area 1112 can form a reservoir for the powder material.

Figure 21D:
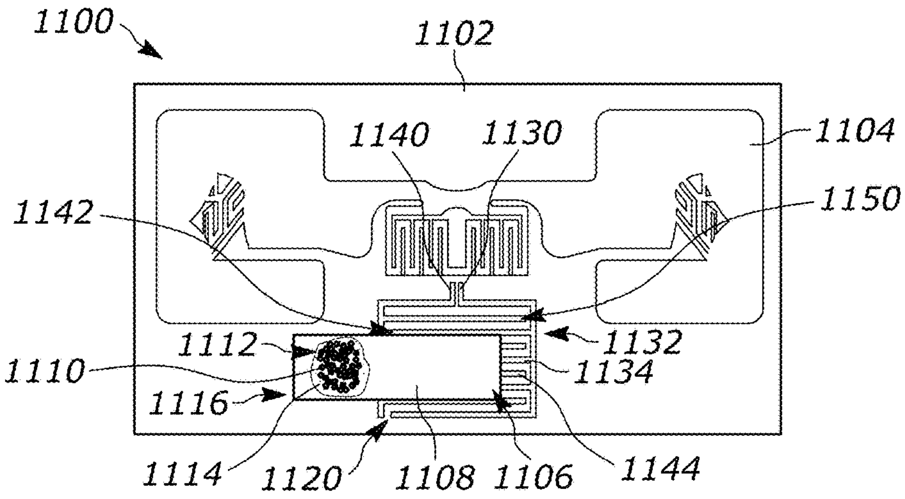

FIG. 21D illustrates an adhesive 1114 dispensed on top of the powder material 1110 in the second area 1112, according to at least one aspect of the present disclosure. In at least one aspect, the adhesive 1114 was dispensed by the adhesive dispenser 280 as discussed in regard to FIG. 20. For example, between 1 mg to 3 mg of adhesive material is dispensed by the adhesive dispenser 280. The media element 1100 can then be laminated by the lamination device 320 as discussed in regard to FIG. 20.

The portion 1120 of the electrical component 1104, the wick 1108, the powder material 1110, and the adhesive 1114 form the activatable environmental sensor 1116. In at least one aspect, the activatable environmental sensor 1116 is a temperature sensitive activatable environmental sensor. As such, the predetermined environmental condition is temperature exposure above a predetermined threshold temperature. In some aspects, the temperature exposure has to occur for a threshold amount of time. The environmental sensor 1116 is activated by applying a force to the environmental sensor 1116 to rupture at least a portion of the microcapsules releasing the indicator material 158. The released indicator material 158 does not migrate/diffuse along the wick 1108 until the media element 1100 is exposed to a temperature above the predetermined temperature threshold. When the activated environmental sensor 1116 is exposed to a temperature above the predetermined temperature threshold, the environmental indicator material 158 migrates/diffuses along the wick 1108 to the second area 1112. In at least one aspect, the predetermined temperature threshold is between −25° C. and 70° C. In an alternative aspect, the predetermined temperature threshold is between 5° C. and 70° C. As discussed above, the predetermined temperature threshold is based on the type of environmental sensor indicator.

The migration of the environmental indicator material 158 into the second area 1112 may cause a change in an electrical property of the electrical component. In at least one aspect, the change in an electrical property is a change of the capacitance of the portion 1120 of the electrical component 1104. In at least one aspect, the portion 1120 is a capacitor and the capacitance of the capacitor is changed by the environmental indicator material 158. As the indicator material 158 is migrated/diffused into/along the gap 1150, there may be a change in the dielectric constant of the portion of the gap 1150, thereby changing the capacitance of the electrical component 1104. The observable effect is a change in the capacitance of the electrical component 1104. When the electrical component is associated with an RFID tag system, this capacitance change may cause an integrated circuit of the RFID tag system to indicate the temperature change.

Figure 21E:
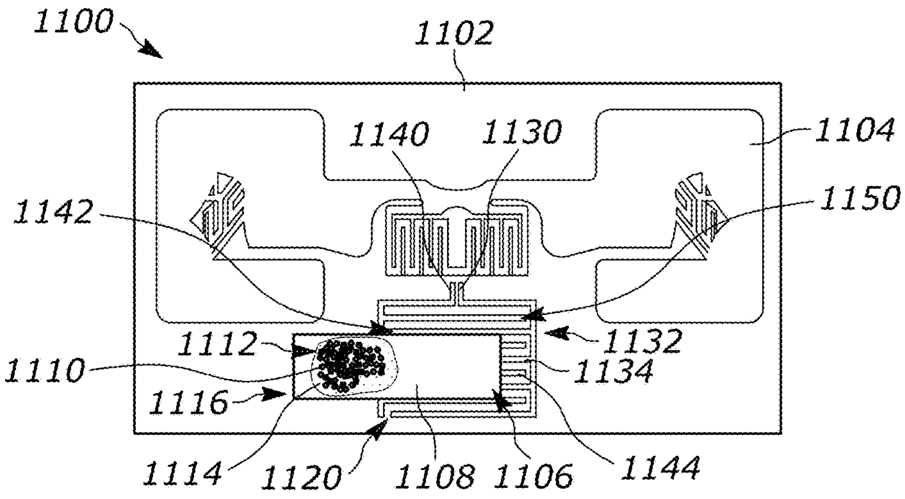

FIG. 21E illustrates the activatable environmental sensor 1116 after an activation process was performed and the activatable environmental sensor 1116 is in an activated configuration, according to at least one aspect of the present disclosure. For example, a force greater than a predetermined threshold force was applied to the environmental sensor causing at least a portion of the microcapsules 154 to rupture releasing an environmental indicator material 158 (FIGS. 14-16). This causes the environmental sensor 1116 to go from a non-activated configuration to an activated configuration. As shown in FIG. 21E, the environmental indicator material 158 has not migrated/diffused along the wick 1108 since the media element 1106 has not been exposed to a temperature above the predetermined temperature threshold. In FIG. 21E, the environmental sensor 1116 is in an initial sensor state.

In at least one aspect, the environmental indicator material 158 is a polar protic material capable of exhibiting a detectable response upon the occurrence of a predetermined environmental condition. The polar protic material may comprise of any of the following: polyethylene glycol, acetic acid, methanol, ethanol, propanol, butanol, pentadecanol, hexanol, decanol, undecanol, dodecanol, tridecanol, ammonia, or any combination thereof. It will be appreciated that the polar protic materials listed are purely exemplary and any polar protic material may be utilized. In some examples, the polar protic material may be an organic material. In some examples, the polar protic material may also exhibit crystalline properties. Additives, for example colorants, viscosity altering agents, or other materials may also be combined with the polar protic material. In some examples, the environmental indicator material 158 may be made of a solid with a melting point at or around the threshold which the indicator is to detect exposure to; at or around the melting point; a viscous material whose viscosity is low enough to prevent flow along the wick 1108 below the temperature excursion threshold, but whose viscosity allows flow along the wick 1108 above the threshold. In other examples, the environmental indicator material 158 may be made of any other suitable dielectric material that changes its state or viscosity so that it can flow along the wick 1108 when exposed to a temperature above the predetermined environmental condition.

Figure 21F:
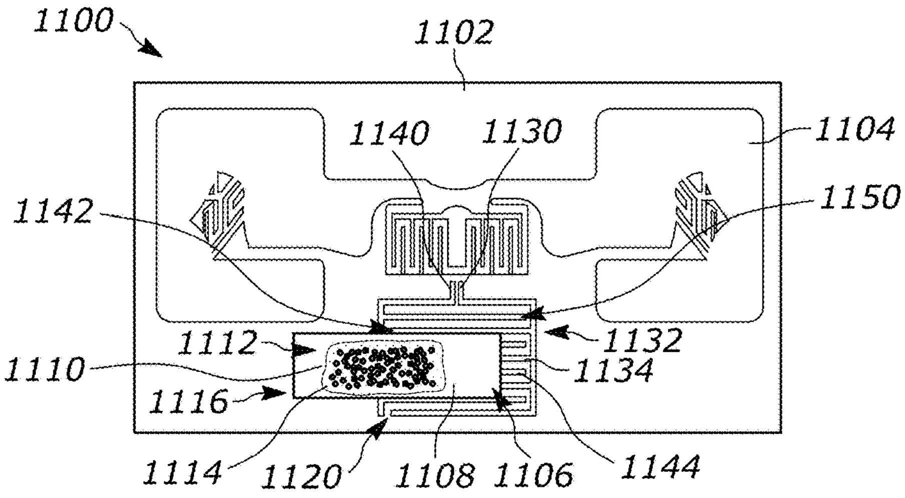

FIG. 21F illustrates the activated environmental sensor 1116 after exposure to the predetermined environmental condition, according to at least one aspect of the present disclosure. As shown in FIG. 21F, the environmental indicator material 158 has migrated/diffused along the wick 1108 into the second area 1112 since the media element 1100 was exposed to a temperature above the predetermined temperature threshold. As such, the environmental sensor 1116 is in a second sensor state. In at least one aspect, the observable effect is a change in an electrical property of the electrical component 1104. As the indicator material 158 is migrated/diffused into/along the gap 1150, there may be a change in the dielectric constant of the portion of the gap 1150, thereby changing the capacitance of the electrical component 1104. When the electrical component is associated with an RFID tag system, this capacitance change may cause an integrated circuit of the RFID tag system to indicate the temperature change.

In at least one aspect, the environmental sensor 1116 is similar to the environmental sensor described in the commonly owned U.S. patent application, titled "USE OF ENCAPSULATED POLAR PROTIC CHEMISTRIES FOR RFID TEMPERATURE MONITORING", application Ser. No. 18/369,506, filed Sep. 18, 2023.

FIG. 22 illustrates an example method 1200 that can be executed by a control circuit (e.g. control circuit 500) of the system of 1000, according to at least one aspect of the present disclosure. The method 1200 includes the control circuit moving 1202 a media element (e.g. media element 100) out of the media supply, for example by the media supply device 210. The method 1200 further includes the control circuit positioning 1204 a wick on the media element, for example by the wick dispenser 300. The method 1200 further includes the control circuit dispensing 1206 a powder material on the media element in a sensor area, for example by the powder dispenser 260. The method 1200 further includes the control circuit dispensing 1208 an adhesive to the media element, for example by the adhesive dispenser 280. The method 1200 further includes the control circuit laminating 1210 the media element, for example by the lamination device 320. The method 1200 further includes (optionally) the control circuit applying 1212 a filler material to the media element, for example by the filler material device. The method 1200 further includes the control circuit collecting 1214 the media element, for example by the take-up device 360.

In at least one aspect, the method 1200 further includes the control circuit positioning the media element proximate each device 260, 280, 300, 320, and 340. For example, the a media web including the plurality of media elements can span from the media supply device 210 to the take-up device 360 and the control circuit can control the movement of the media elements out of the media supply device 210 and into the take-up device 360. As the media element moves from the media supply device 210 to the take-up device 360, the media elements can be positioned proximate each device 260, 280, 300, 320, and 340. As another example, the media elements can be positioned on a conveyor and moved by the control circuit into position proximate the each device 260, 280, 300, 320, and 340. In yet another example, a robotic arm and/or grasper can be controlled by the control circuit to move the media elements proximate each device 260, 280, 300, 320, and 340. In an alternative aspect, the method 1200 further includes positioning each device 260, 280, 300, 320, and 340 proximate a media element. For example, each device can be attached to a robotic arm and the robotic arms can be moved by the control circuit to position each device 260, 280, 300, 320, and 340 proximate a media element.

FIG. 23 illustrates a diagram of an example system 1300 to create an environmental sensor with powder dispensing, according to at least one aspect of the present disclosure. In at least one aspect, the powder dispenser 260 dispenses microcapsules 154 as discussed in regard to FIGS. 14-16. The system 1300 is substantially similar to the systems 200, 900, and 1000 with in some instances some devices removed and/or added and the operation of the devices reordered. For the sake of brevity, not all the similarities between the system 1000, the system 900, and the system 200 will be discussed in detail.

Similar to the system 1000, the system 1300 includes the media supply device 210, the particle dispenser 260, the wick dispenser, the lamination device 320, and a media take-up device 360 similar to the systems 200, 900 and 1000. The media supply device 210 includes a media supply including a plurality of media elements (e.g. media elements 1400, see FIG. 24A). The media supply includes a plurality of media elements. Each media element includes a media substrate (e.g. media substrate 1102, see FIG. 21A). In at least one aspect, the media substrates are a paper or polymer material. The media supply can be a spool of media elements on a web, a stack of media elements on a web, a stack of individual media elements, or any other group of media elements. Media supply device 211 (FIG. 4) is one example of the media supply device 210.

The system 1300 is configured to place an environmental sensor (e.g. environmental sensor 1420) on each media element and then collect the media elements in the media take-up device 360. The system 1300 is configured to create an activatable environmental sensor. Referring to FIG. 23, the media supply device 210 includes a media supply including a plurality of media elements.

The system 1300 positions a media element of the plurality of media elements proximate the adhesive dispenser 280. In at least one aspect, the adhesive dispenser 280 dispenses an adhesive to a sensor area (e.g. sensor area 1412) on the media element (e.g. media element 1400). In at least one aspect, between 1 mg and 3 mg of an adhesive is dispensed. Some example adhesives include polyvinyl acetate, polyvinyl alcohol, and any other similar adhesive. In at least one aspect, the adhesive dispenser 280 is a liquid dispenser. In at least one aspect, the adhesive is dispensed hot at a temperature between 30° C. and 100° C. In an alternative aspect, the adhesive is dispensed at room temperature. Adhesive dispenser 281 (FIG. 7) is one example of the adhesive dispenser 280.

In an alternative aspect, the adhesive dispenser 280 is configured to place a substrate that includes an adhesive side in the sensor area where the adhesive side is positioned away from the media substrate (e.g. media substrate 1404). A pick-n-place device similar to the wick dispenser 301 (FIG. 8) is one example of a dispenser that could dispense a substrate that includes an adhesive side.

After the adhesive is dispensed, the system 1300 positions the media element proximate the powder dispenser 260. Powder dispenser 261 (FIG. 6) is one example of the powder dispenser 260. The powder dispenser 260 dispenses a dry powder material on the media element in the sensor area on the media element. The powder material is dispensed on the dispensed adhesive. In at least one aspect, the powder material is held in position by the dispensed adhesive. In at least one aspect, the amount of the powder material dispensed is between 1 mg to 5 mg for each media element. The powder material forms at least part of the environmental sensor (e.g. environmental sensor 1420, see FIG. 24C). This powder material includes microcapsules 154 as discussed in regard to FIGS. 14-16.

After the powder material is dispensed, the system 1300 positions the media element proximate the wick dispenser 300. The wick dispenser 300 is configured to pull a wick from a supply of wicks and position the wick on the media element. Wick dispenser 301 is one example of the wick dispenser 300 (See FIG. 8). The wick is positioned such that the wick covers at least a portion of the sensor area on the media element. As such, in at least one aspect, the wick is in position to absorb the indicator material 158 when the microcapsules 154 are ruptured. In at least one aspect, after exposure to a predetermined environmental condition, the observable effect is a color change of the wick. For example, the wick absorbs the indicator material 158, and, in at least one aspect, the indicator material 158 can change color due to exposure to a predetermined environmental condition. In at least one aspect, the predetermined environmental condition is exposure to a temperature excursion above a predetermined temperature threshold for at least a predetermined amount of time.

After the wick is dispensed, the system 1300 can position the media element proximate the lamination device 320. The lamination device adds a lamination layer to the media element. The lamination layer is a laminate and can be made of a plastic material. In at least one aspect, the lamination layer covers the sensor area. In at least one aspect, the lamination layer holds the powder material, adhesive, and wick of the environmental sensor in position. The lamination layer can cover the entire surface of the media element or only an area within the surface of the media element. Lamination device 321 (FIG. 9) is one example of the lamination device 320.

In at least one aspect, the system 1300 can further include a filler material dispenser 340 similar to the systems 200, 900 and 1000. Before or after the lamination is applied, the filler material dispenser 340 can dispenser a filler material (e.g. filler material 156, see FIG. 18) onto the medial element, if desired. When a filler material is applied to the media element, the filler material can cover an area outside of the first area and second area and provides a generally uniform thickness to the media element. For example, the powder material and wick will have a thickness on the media element and the filler material can be used to make the thickness of the media element outside of the sensor area the same thickness as the sensor area. Stated another way, the filler material can be used to bridge the gap between layers formed by the thickness of the environmental sensor so that a thickness of the media element is uniform. In at least one aspect, the filler material is a paper or polymer material. In some aspects, the paper or polymer material can have an adhesive that allows the filler material to stick to the media element. In at least one aspect, the size and type of filler material is based on the type of environmental sensor attached to the media element. Filler material device 341 (FIG. 10) is one example of a filler material dispenser 340.

FIGS. 24A-F illustrates an example of creating an activatable environmental sensor 1420 with powder dispensing, activating the environmental sensor 1420, and exposing the activated environmental sensor 1420 to a predetermined environmental condition, according to at least one aspect of the present disclosure. In at least one aspect, the media element 1400 is includes a media substrate 1404.

Figure 24A:
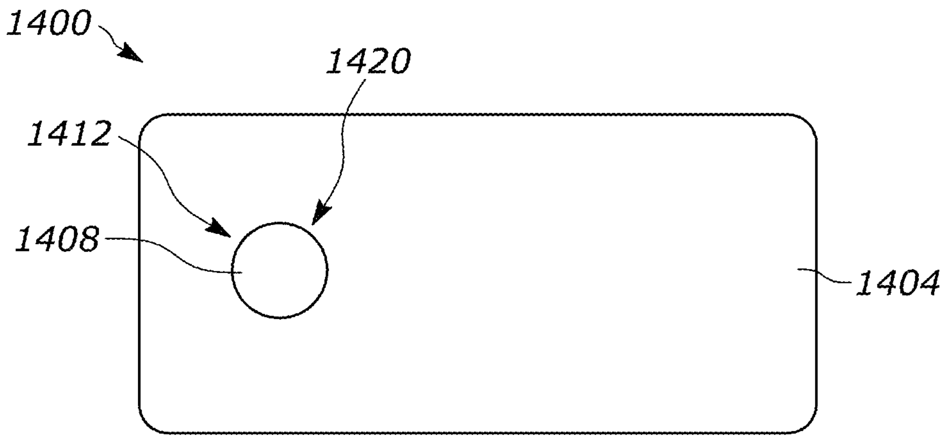
FIGS. 24A-F illustrates an example of creating an activatable environmental sensor with powder dispensing, activating the environmental sensor, and exposing the activated environmental sensor to a predetermined environmental condition, according to at least one aspect of the present disclosure.
Figure 25:
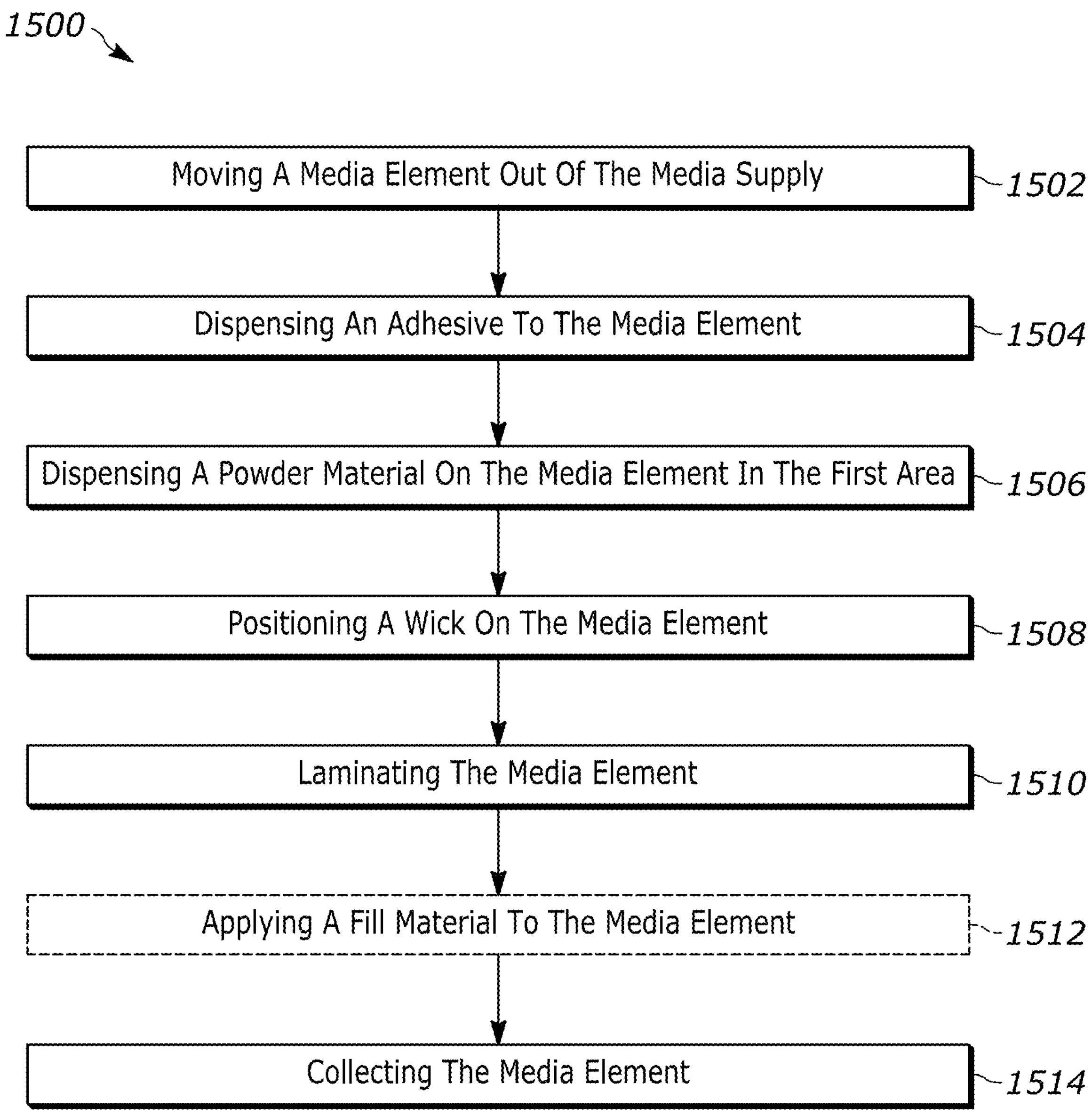
FIG. 25 illustrates a method that can be executed by a control circuit of the system of FIG. 23, according to at least one aspect of the present disclosure.

FIG. 24A illustrates an adhesive 1408 dispensed on a media substrate 1404 of a media element 1400, according to at least one aspect of the present disclosure. The adhesive 1408 is dispensed in the sensor area 1412 on the media substrate 1404. In at least one aspect, the adhesive 1408 was dispensed by the adhesive dispenser 280 as discussed in regard to FIG. 23. For example, between 1 mg to 3 mg of adhesive material is dispensed by the adhesive dispenser 280.

Figure 24B:
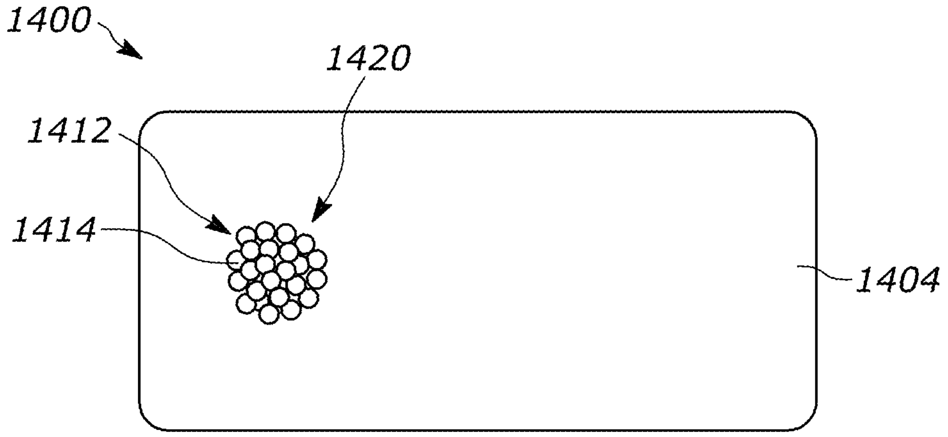

FIG. 24B illustrates a powder material 1414 dispensed in the sensor area 1412 on the media element 1400 on top of the adhesive 1408, according to at least one aspect of the present disclosure. In at least one aspect, the powder material 1414 was dispensed by the powder dispenser 260 as discussed in regard to FIG. 23. For example, between 1 mg to 5 mg of powder material is dispensed by the powder dispenser 260. The powder material includes microcapsules 154 encapsulating an environmental indicator material as discussed in regard to FIGS. 14-16.

Figure 24C:
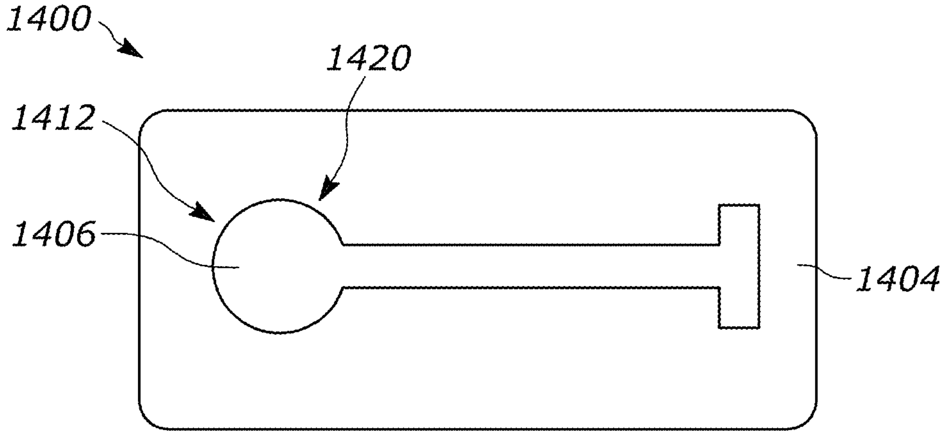
Figure 24D:
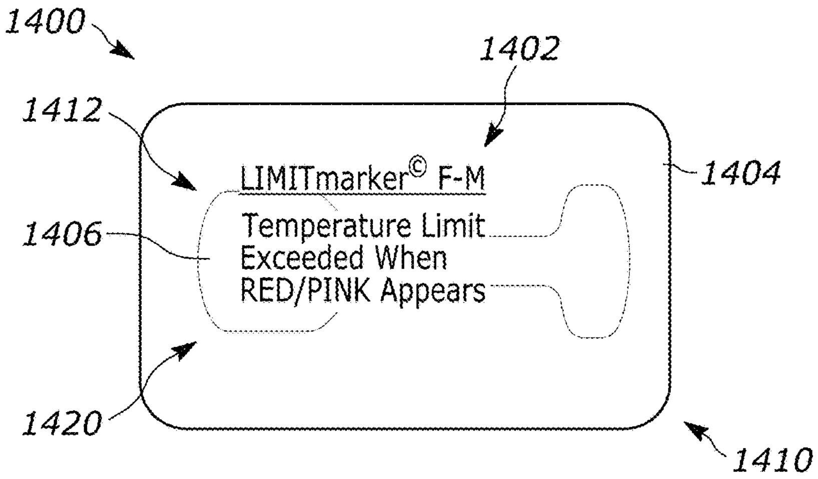

FIG. 24C illustrates a wick 1108 positioned on the media element 1400 covering at least a portion of the sensor area 1412, according to at least one aspect of the present disclosure. In at least one aspect, the wick 1108 was positioned by the wick dispenser 300 as discussed in regard to FIG. 23. The wick 1406 covers at least a portion of the sensor area 1412 on the media element. Once the wick 1406 is positioned on the media substrate 1404, the media element 1400 can then be laminated by the lamination device 320 as discussed in regard to FIG. 23.

The wick 1406, the powder material 1414, and the adhesive 1408 form the activatable environmental sensor 1420. In at least one aspect, the activatable environmental sensor 1420 is a temperature sensitive activatable environmental sensor. As such, the predetermined environmental condition is temperature exposure above a predetermined threshold temperature. In some aspects, the temperature exposure has to occur for a threshold amount of time. The environmental sensor 1420 is activated by applying a force to the environmental sensor 1420 to rupture at least a portion of the microcapsules 154 releasing the indicator material 158. The released indicator material 158 is absorbed by or rests against the wick 1406. When the activated environmental sensor 1420 is exposed to a temperature above the predetermined temperature threshold, the environmental indicator material 158 changes color (e.g. turning red) of the wick 1406 to indicate the media element 1400 was exposed to a temperature above the predetermined temperature threshold. As such, the observable effect is a color change of the wick 1406. In at least one aspect, the predetermined temperature threshold is between −25° C. and 70° C. In an alternative aspect, the predetermined temperature threshold is between 5° C. and 70° C. As discussed above, the predetermined temperature threshold is based on the type of environmental sensor indicator.

FIG. 21D illustrates the activatable environmental sensor 1420 in a non-activated configuration. The media element 1400 has a lamination layer 1410. In some aspects, the lamination layer 1410 can be printed on before being applied to the media element 1400. In an alternative aspect, the lamination layer 1410 can be printed on after being applied to the media element 1400. Some example text 1402 is shown on the lamination layer 1410 of the media element 1400.

Figure 24E:
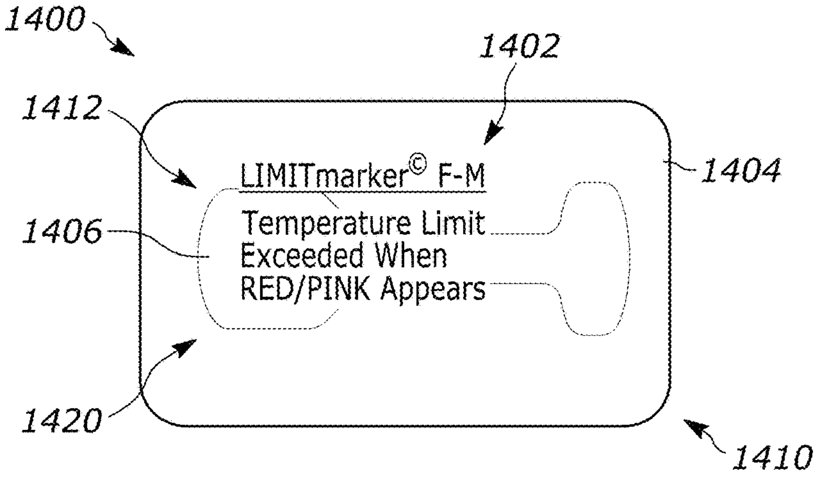

FIG. 24E illustrates the activatable environmental sensor 1420 after an activation process was performed and the activatable environmental sensor 1420 is in an activated configuration, according to at least one aspect of the present disclosure. For example, a force greater than a predetermined threshold force was applied to the environmental sensor causing at least a portion of the microcapsules 154 to rupture releasing an environmental indicator material 158 (FIGS. 14-16). This causes the environmental sensor 1420 to go from a non-activated configuration to an activated configuration. In some aspects, as shown in FIG. 24E, the activation process does not produce an observable effect until the environmental sensor 1420 is exposed to the predetermined environmental condition. In FIG. 24E, the environmental sensor 1420 is in an initial sensor state.

Figure 24F:
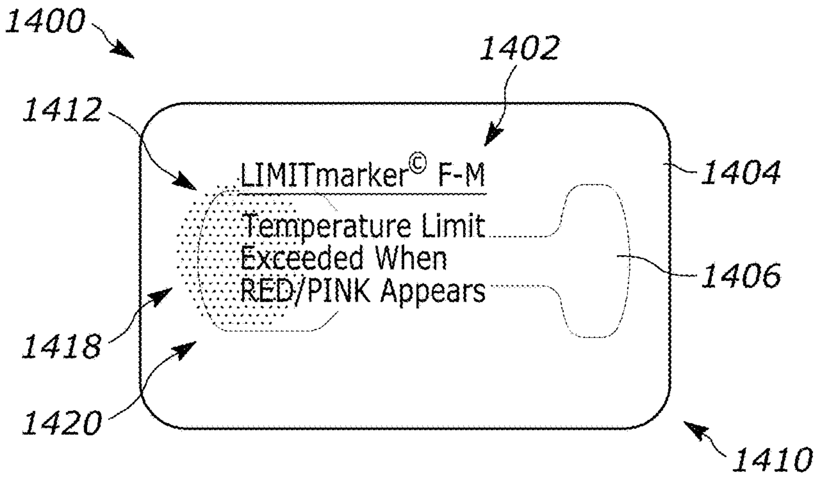

FIG. 24F illustrates the activated environmental sensor 1420 after exposure to the predetermined environmental condition, according to at least one aspect of the present disclosure. As shown in FIG. 24F, the environmental indicator material 158 changed the color of the wick 1406 in the sensor area 1412 producing an observable effect 1418, after the media element 1100 was exposed to a temperature above the predetermined temperature threshold. As such, the environmental sensor 1420 is in a second sensor state. In at least one aspect, the observable effect is a change in color of at least a portion of the wick 1406.

One non-limiting example of an indicator material to change the color of the wick 1406 is a wax with a colorant. As such, when the wax is released from the microcapsules 154, the wax rests against the wick 1406. When the wax is exposed to the temperature above the predetermined threshold temperature, then the wax melts and gets absorbed into the wick 1406 changing the color of the wick 1406 to match the colorant. There are many other similar indicator materials 158 that can be used to change the color of the wick 1406. Some examples, have the indicator material 158 absorbed before the exposure to the predetermined temperature threshold, while other examples have the indicator material 158 absorbed after the exposure to the predetermined temperature threshold.

FIG. 25 illustrates an example method 1500 that can be executed by a control circuit (e.g. control circuit 500) of the system of 1300, according to at least one aspect of the present disclosure. The method 1500 includes the control circuit moving 1502 a media element (e.g. media element 100) out of the media supply, for example by the media supply device 210. The method 1500 further includes the control circuit dispensing 1504 an adhesive to the media element, for example by the adhesive dispenser 280. The method 1500 further includes the control circuit dispensing 1506 a powder material on the media element in a sensor area, for example by the powder dispenser 260. The method 1500 further includes the control circuit positioning 1508 a wick on the media element, for example by the wick dispenser 300. The method 1500 further includes the control circuit laminating 1510 the media element, for example by the lamination device 320. The method 1500 further includes (optionally) the control circuit applying 1512 a filler material to the media element, for example by the filler material device. The method 1500 further includes the control circuit collecting 1514 the media element, for example by the take-up device 360.

In at least one aspect, the method 1500 further includes the control circuit positioning the media element proximate each device 260, 280, 300, 320, and 340. For example, the a media web including the plurality of media elements can span from the media supply device 210 to the take-up device 360 and the control circuit can control the movement of the media elements out of the media supply device 210 and into the take-up device 360. As the media element moves from the media supply device 210 to the take-up device 360, the media elements can be positioned proximate each device 260, 280, 300, 320, and 340. As another example, the media elements can be positioned on a conveyor and moved by the control circuit into position proximate the each device 260, 280, 300, 320, and 340. In yet another example, a robotic arm and/or grasper can be controlled by the control circuit to move the media elements proximate each device 260, 280, 300, 320, and 340. In an alternative aspect, the method 1500 further includes positioning each device 260, 280, 300, 320, and 340 proximate a media element. For example, each device can be attached to a robotic arm and the robotic arms can be moved by the control circuit to position each device 260, 280, 300, 320, and 340 proximate a media element.

In the foregoing detailed description, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

The foregoing detailed description has set forth various forms of the systems and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, and/or examples can be implemented, individually and/or collectively, by a wide range of hardware, software, firmware, or virtually any combination thereof. Those skilled in the art will recognize that some aspects of the forms disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as one or more program products in a variety of forms, and that an illustrative form of the subject matter described herein applies regardless of the particular type of signal bearing medium used to actually carry out the distribution.

Instructions used to program logic to perform various disclosed aspects can be stored within a memory in the system, such as dynamic random access memory (DRAM), cache, flash memory, or other storage. Furthermore, the instructions can be distributed via a network or by way of other computer readable media. Thus a machine-readable medium may include any mechanism for storing or transmitting information in a form readable by a machine (e.g., a computer), but is not limited to, floppy diskettes, optical disks, compact disc, read-only memory (CD-ROMs), and magneto-optical disks, read-only memory (ROMs), random access memory (RAM), erasable programmable read-only memory (EPROM), electrically erasable programmable read-only memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the non-transitory computer-readable medium includes any type of tangible machine-readable medium suitable for storing or transmitting electronic instructions or information in a form readable by a machine (e.g., a computer).

Any of the software components or functions described in this application, may be implemented as software code to be executed by a processor using any suitable computer language such as, for example, Python, Java, C++ or Perl using, for example, conventional or object-oriented techniques. The software code may be stored as a series of instructions, or commands on a computer readable medium, such as RAM, ROM, a magnetic medium such as a hard-drive or a floppy disk, or an optical medium such as a CD-ROM. Any such computer readable medium may reside on or within a single computational apparatus, and may be present on or within different computational apparatuses within a system or network.

As used in any aspect herein, the term "logic" may refer to an app, software, firmware and/or circuitry configured to perform any of the aforementioned operations. Software may be embodied as a software package, code, instructions, instruction sets and/or data recorded on non-transitory computer readable storage medium. Firmware may be embodied as code, instructions or instruction sets and/or data that are hard-coded (e.g., nonvolatile) in memory devices.

As used in any aspect herein, the terms "component," "system," "module" and the like can refer to a computer-related entity, either hardware, a combination of hardware and software, software, or software in execution.

As used in any aspect herein, an "algorithm" refers to a self-consistent sequence of steps leading to a desired result, where a "step" refers to a manipulation of physical quantities and/or logic states which may, though need not necessarily, take the form of electrical or magnetic signals capable of being stored, transferred, combined, compared, and otherwise manipulated. It is common usage to refer to these signals as bits, values, elements, symbols, characters, terms, numbers, or the like. These and similar terms may be associated with the appropriate physical quantities and are merely convenient labels applied to these quantities and/or states.

Unless specifically stated otherwise as apparent from the foregoing disclosure, it is appreciated that, throughout the present disclosure, discussions using terms such as "processing," "computing," "calculating," "determining," "displaying," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that typically a disjunctive word and/or phrase presenting two or more alternative terms, whether in the description, claims, or drawings, should be understood to contemplate the possibilities of including one of the terms, either of the terms, or both terms unless context dictates otherwise. For example, the phrase "A or B" will be typically understood to include the possibilities of "A" or "B" or "A and B."

As used in any aspect herein, the term "control circuit" may refer to, for example, hardwired circuitry, programmable circuitry (e.g., a computer processor including one or more individual instruction processing cores, processing unit, processor, microcontroller, microcontroller unit, controller, digital signal processor (DSP), programmable logic device (PLD), programmable logic array (PLA), or field programmable gate array (FPGA)), state machine circuitry, firmware that stores instructions executed by programmable circuitry, and any combination thereof. The control circuit may, collectively or individually, be embodied as circuitry that forms part of a larger system, for example, an integrated circuit (IC), an application-specific integrated circuit (ASIC), a system on-chip (SoC), desktop computers, laptop computers, tablet computers, servers, smart phones, etc. Accordingly, as used herein "control circuit" includes, but is not limited to, electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of random access memory), and/or electrical circuitry forming a communications device (e.g., a modem, communications switch, or optical-electrical equipment). Those having skill in the art will recognize that the subject matter described herein may be implemented in an analog or digital fashion or some combination thereof.

As used in any aspect herein, the terms "component," "system," "module" and the like can refer to a computer-related entity, either hardware, a combination of hardware and software, software, or software in execution.

It will be appreciated that some embodiments may be comprised of one or more specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions can be implemented by a state machine that has no stored program instructions, or in one or more application specific integrated circuits (ASICs), in which each function or some combinations of certain of the functions are implemented as custom logic. Of course, a combination of the two approaches can be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

It is worthy to note that any reference to "one aspect," "an aspect," "an exemplification," "one exemplification," and the like means that a particular feature, structure, or characteristic described in connection with the aspect is included in at least one aspect. Thus, appearances of the phrases "in one aspect," "in an aspect," "in an exemplification," and "in one exemplification" in various places throughout the specification are not necessarily all referring to the same aspect. Furthermore, the particular features, structures or characteristics may be combined in any suitable manner in one or more aspects.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A process to manufacture an environmental sensor, the process comprising:

dispensing a dry powder material to a first area on a media element, wherein the powder material comprises a plurality of microcapsules, each microcapsule encapsulating an environmental indicator material; and dispensing an adhesive to the media element, wherein after the powder material and the adhesive have been dispensed to the media element, the powder material is in contact with the dispensed adhesive, and the adhesive holds the powder material in position.

2. The process of claim 1, wherein the plurality of microcapsules release the environmental indicator material when ruptured, wherein the environmental indicator material is configured, in response to exposure to a predetermined environmental condition, to change from an original state to a second state producing an observable effect, wherein the plurality of microcapsules prevent an occurrence of the observable effect while the environmental indicator material is encapsulated and allow the occurrence of the observable effect when the environmental indicator material is exposed to the predetermined environmental condition after at least a portion of the plurality of microcapsules are ruptured, wherein the process further comprises rupturing at least a portion of the plurality of microcapsules releasing the environmental indicator material, and wherein the observable effect comprises at least one effect selected from the group consisting of a color state change, a change in transparency, a change in hue, a change in an electrical property, a change in conductivity, a change in capacitance, a movement of the environmental indicator material along a substrate, and combinations thereof.

3. The process of claim 2, wherein the predetermined environmental condition comprises at least one condition selected from the group consisting of temperature excursion above a predetermined temperature threshold for at least a predetermined amount of time, temperature excursion below a predetermined temperature for at least a predetermined amount of time, cumulative exposure to temperature over a time period above a predetermined threshold for at least a predetermined amount of time, exposure to a particular chemical, oxygen exposure, ammonia exposure, exposure to a particular chemical above a threshold concentration, exposure to a particular chemical above the threshold concentration for at least a predetermined amount of time, exposure to at least a predetermined amount of radiation of a particular type, ultraviolet light exposure, humidity exposure, exposure to a humidity level above a predetermined threshold, and exposure to a humidity level above a predetermined threshold for at least a predetermined amount of time.

4. The process of claim 3, wherein the predetermined environmental condition comprises temperature excursion above a predetermined threshold for at least a predetermined amount of time.

5. The process of claim 3 wherein the predetermine environmental condition comprises exposure to a humidity level above a predetermined threshold for at least a predetermined amount of time.

6. The process of claim 2, wherein the observable effect comprises a color state change.

7. The process of claim 2, wherein the observable effect comprises a change in an electrical property.

8. The process of claim 2, wherein the observable effect comprises movement of the environmental indicator along a substrate.

9. The process of claim 2, wherein the plurality of microcapsules, prior to their rupture, prevent the observable effect by containing the environmental indicator material when the environmental indicator material liquifies.

10. The process of claim 2, wherein the plurality of microcapsules, prior to their rupture, prevent the observable effect by protecting the environmental indicator material from exposure to the predetermined environmental condition.

11. The process of claim 1, further comprising:

applying a wick to the media element, wherein the wick covers at least a portion of the first area of the media element.

12. The process of claim 11, wherein the plurality of microcapsules release the environmental indicator material when ruptured, wherein the environmental indicator material is configured, in response to exposure to a predetermined environmental condition, to change from an original state to a second state producing an observable effect, wherein the plurality of microcapsules prevent an occurrence of the observable effect while the environmental indicator material is encapsulated and allow the occurrence of the observable effect when the environmental indicator material is exposed to the predetermined environmental condition after at least a portion of the plurality of microcapsules are ruptured; and wherein the process further comprises rupturing at least a portion of the plurality of microcapsules releasing the environmental indicator material into contact with the wick.

13. The process of claim 12, wherein the media element comprises an electrical component, wherein the wick covers at least a portion of the first area of the media element and at least a portion of the electrical component, wherein the predetermined environmental condition comprises a temperature excursion above a predetermined temperature threshold, and wherein in response to exposure to a temperature above the predetermined temperature threshold, the environmental indicator material changes from the original state to the second state producing the observable effect of changing an electrical property of the electrical component.

14. The process of claim 13, wherein the electrical component is positioned outside of the first area, and wherein in response to exposure to the temperature above the predetermined temperature threshold, the environmental indicator material moves along the wick to the electrical component producing the observable effect of changing the electrical property of the electrical component.

15. The process of claim 12, wherein the predetermined environmental condition comprises a temperature excursion above a predetermined temperature threshold, and wherein in response to exposure to a temperature above the predetermined temperature threshold, the environmental indicator material changes from the original state to the second state producing the observable effect of changing a color of at least a portion of the wick of the media element.

16. The process of claim 1, wherein at least a portion of the plurality of microcapsules are ruptured based on a force greater than a predetermined threshold, the force being at least one of a pressure force, a shear force, a frictional force, or a cutting force applied to the media element.

17. The process of claim 16, wherein the force is a pressure force applied to the media element.

18. The process of claim 1, further comprising: applying a wick to the media element, wherein at least a portion of the wick is proximate the first area, so that liquid released from the microcapsules is absorbed by the wick.

19. The process of claim 1, further comprising rupturing the microcapsules by applying heat to the microcapsules.

20. The process of claim 1, further comprising rupturing the microcapsules by applying a combination of heat and pressure to the microcapsules.

* * * * *